Feb. 8, 1955 P. GRAHAM 2,701,417
GRAPHIC MACHINE
Filed March 17, 1948 21 Sheets-Sheet 1
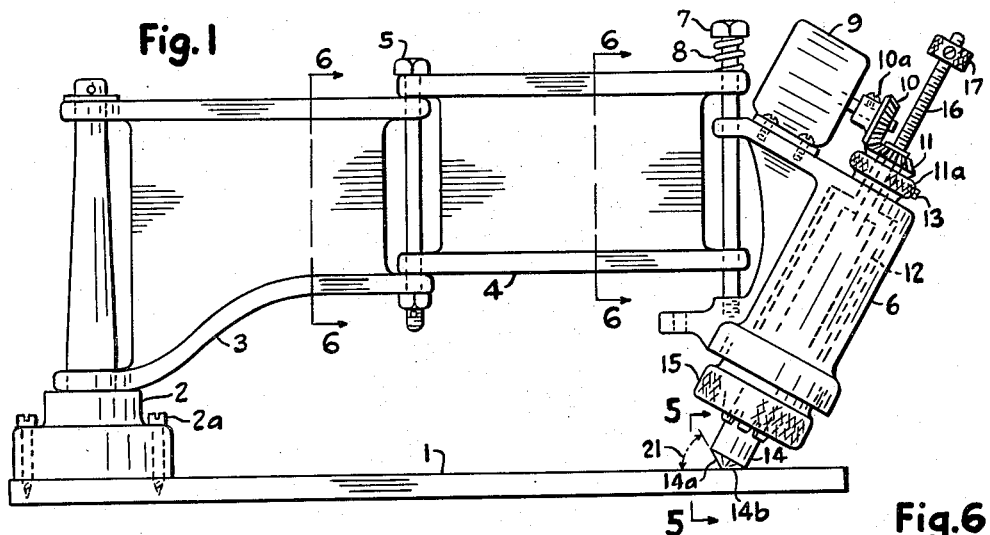
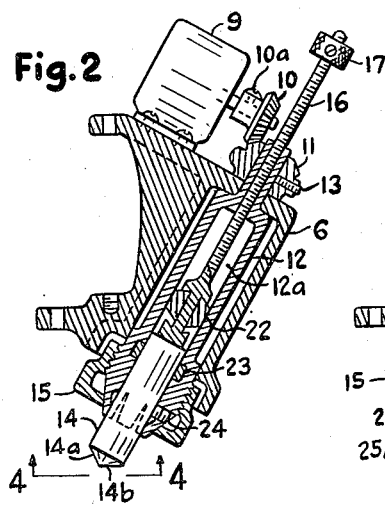
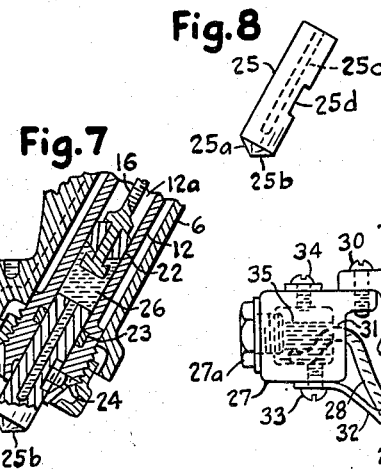
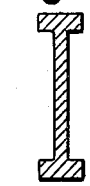
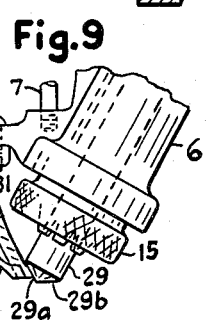
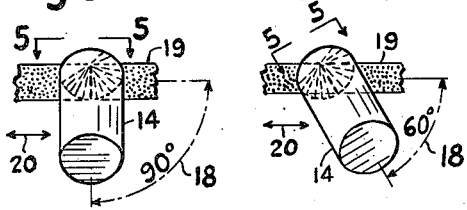
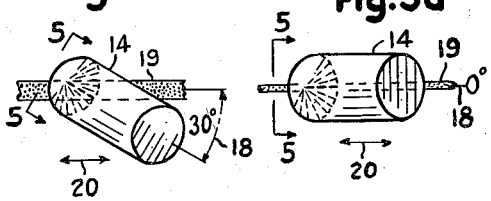
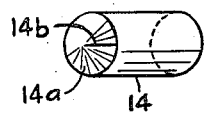
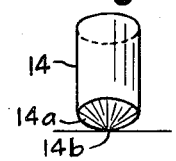
Inventor
Phillip Graham
By
William J. Ruano
Attorney Inventor
Phillip Graham
By William J. Ruano
Attorney Feb. 8, 1955 P. GRAHAM 2,701,417
GRAPHIC MACHINE
Filed March 17, 1948 21 Sheets-Sheet 3

Inventor
PHILLIP GRAHAM
By William J. Ruano
Attorney

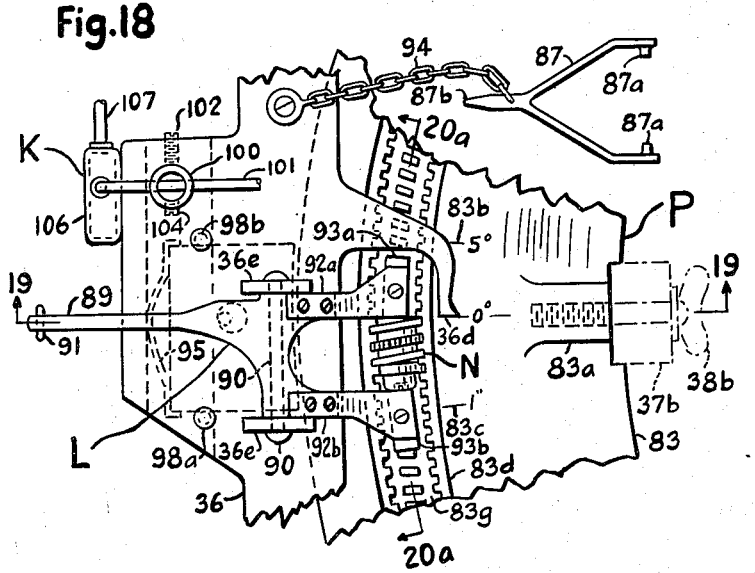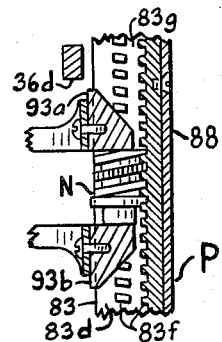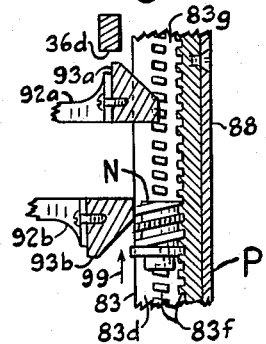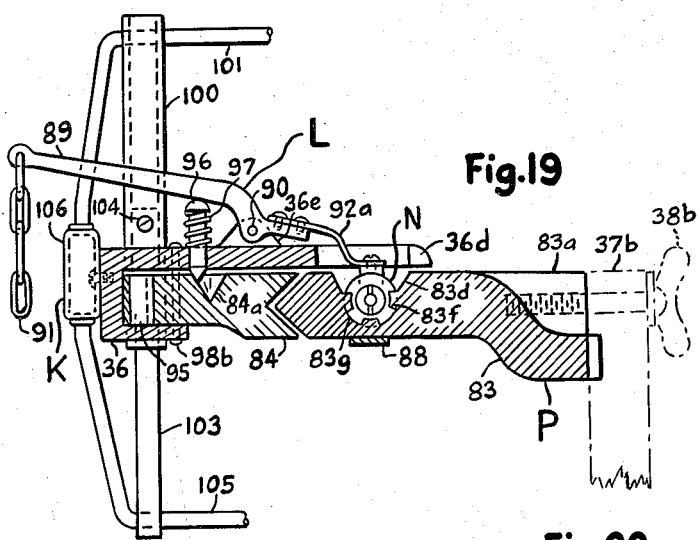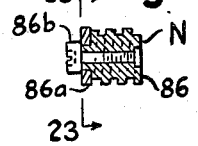

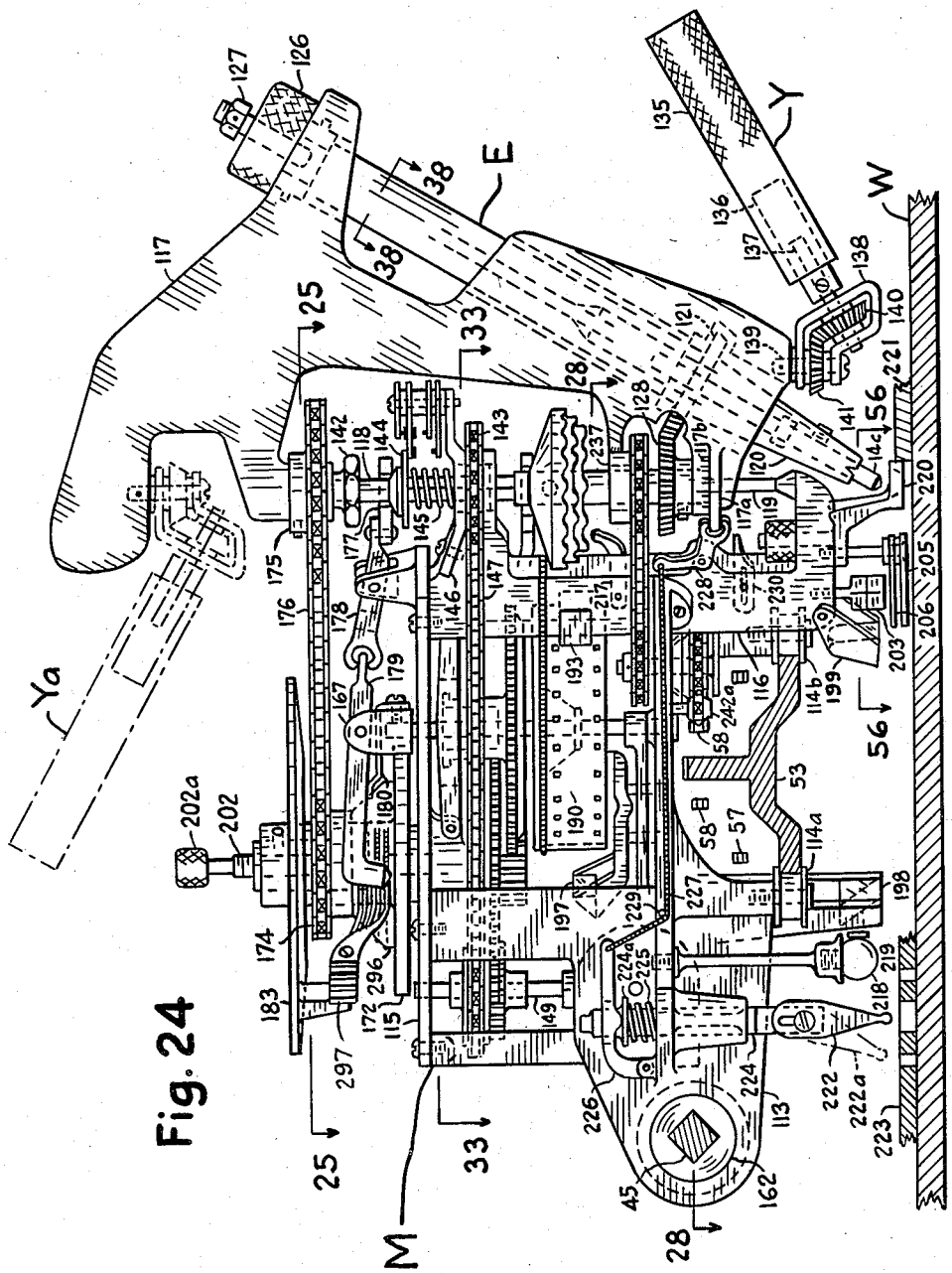

Feb. 8, 1955   P. GRAHAM   2,701,417
GRAPHIC MACHINE
Filed March 17, 1948   21 Sheets-Sheet 6
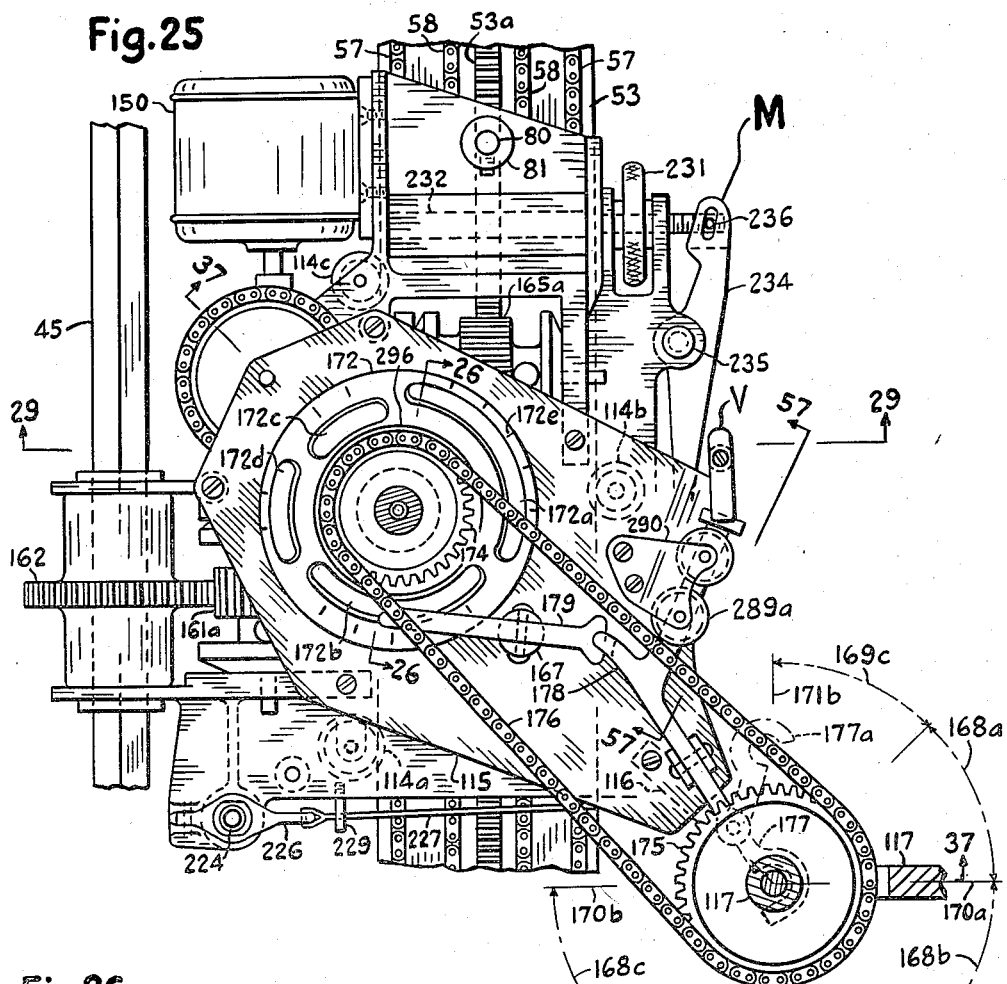
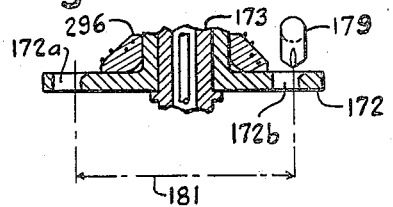
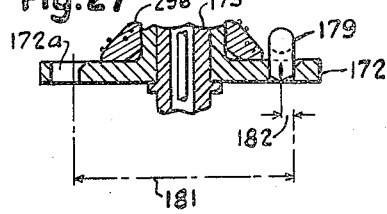
Inventor
Phillip Graham
By
William J. Ruano
Attorney Feb. 8, 1955
P. GRAHAM
2,701,417
GRAPHIC MACHINE
Filed March 17, 1948
21 Sheets-Sheet 7
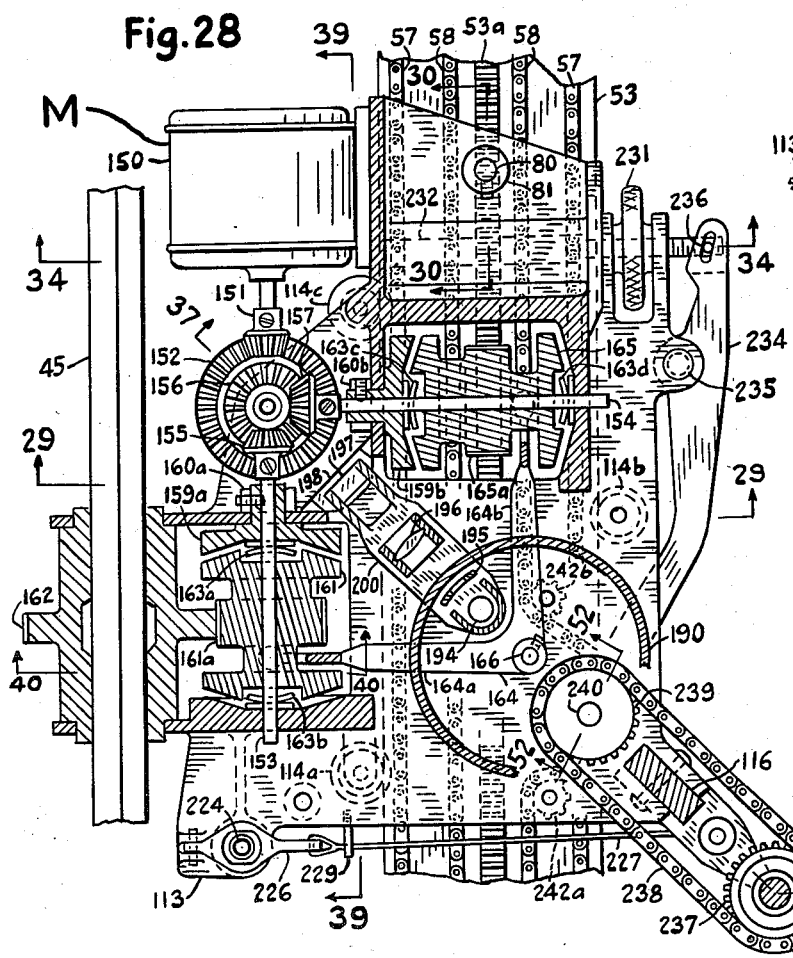
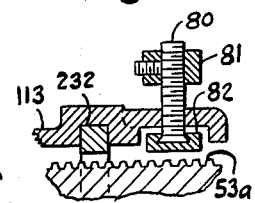
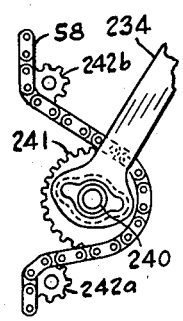
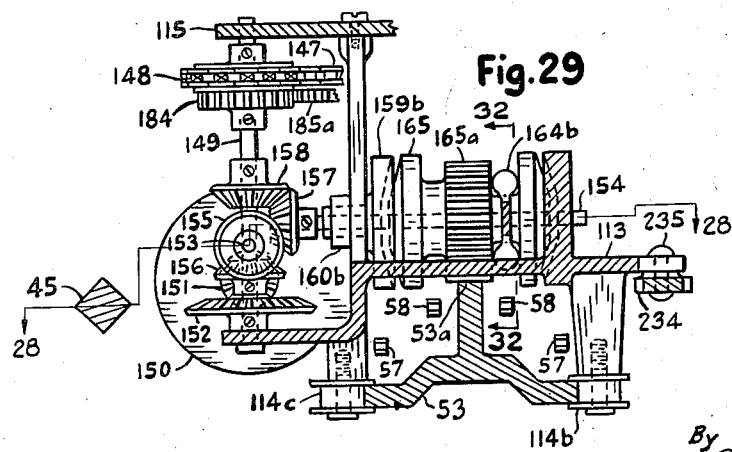
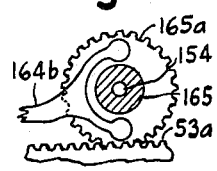
Inventor
Phillip Graham
By
Attorney

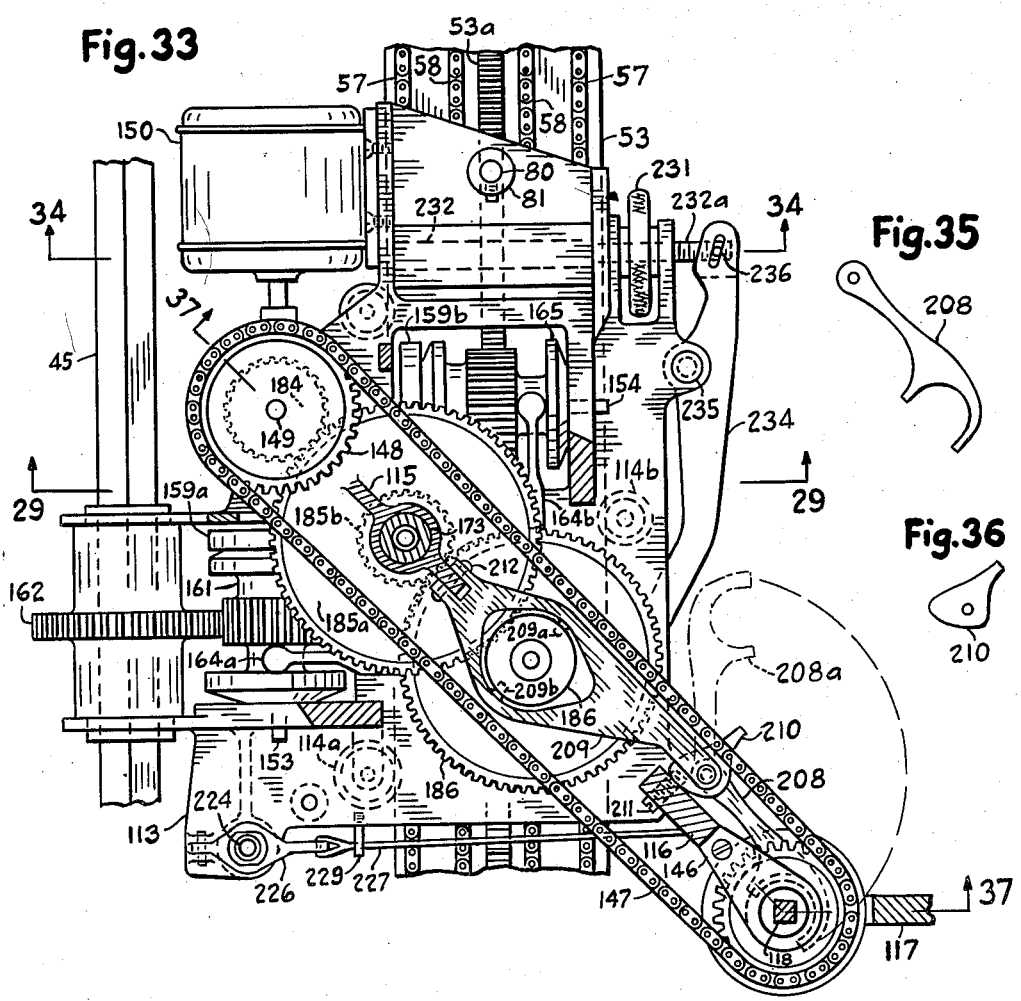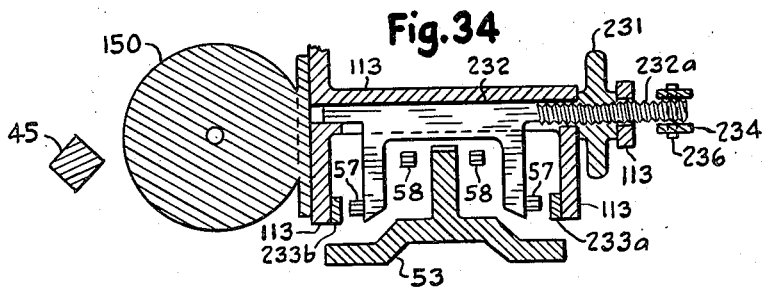

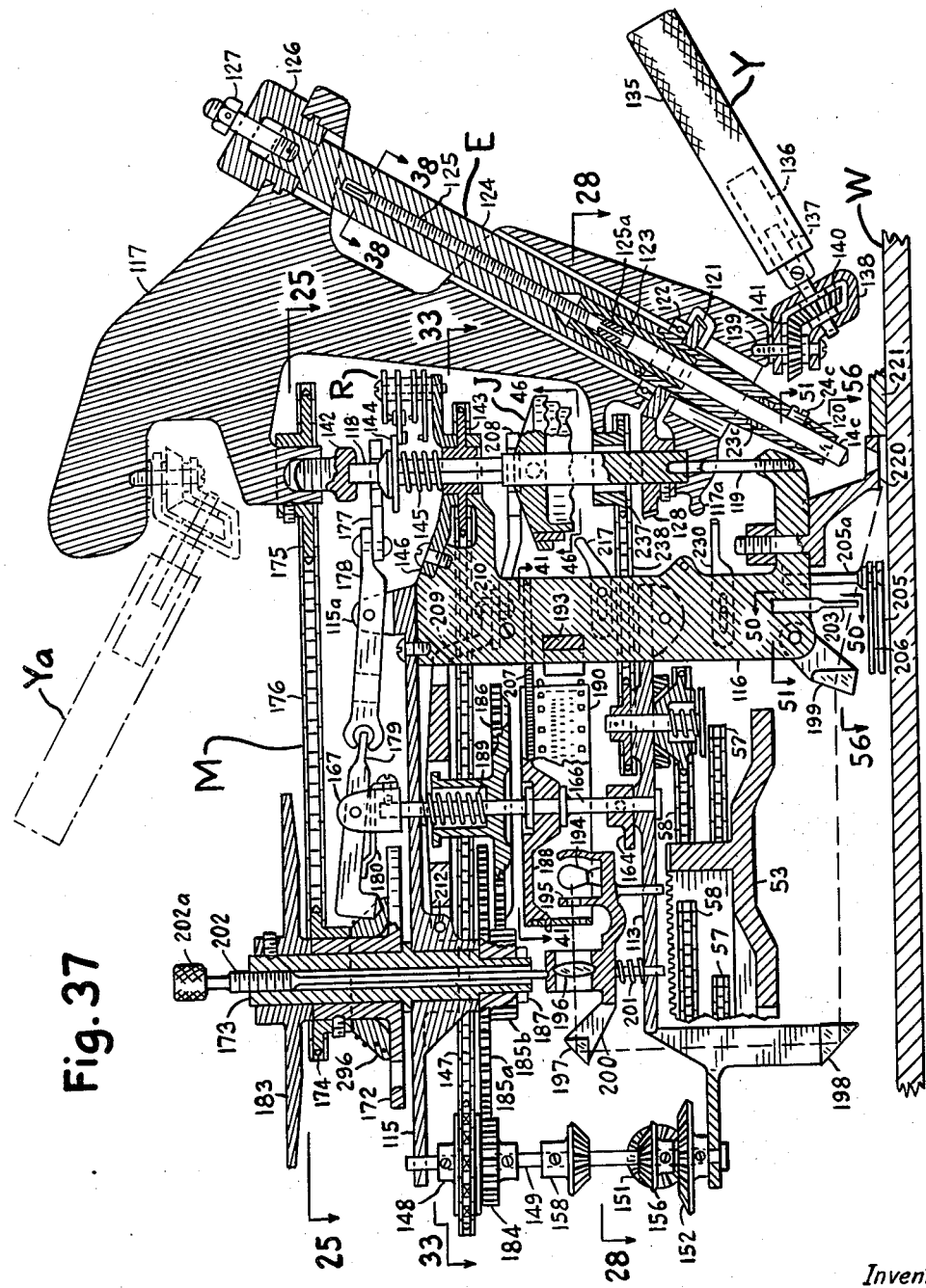

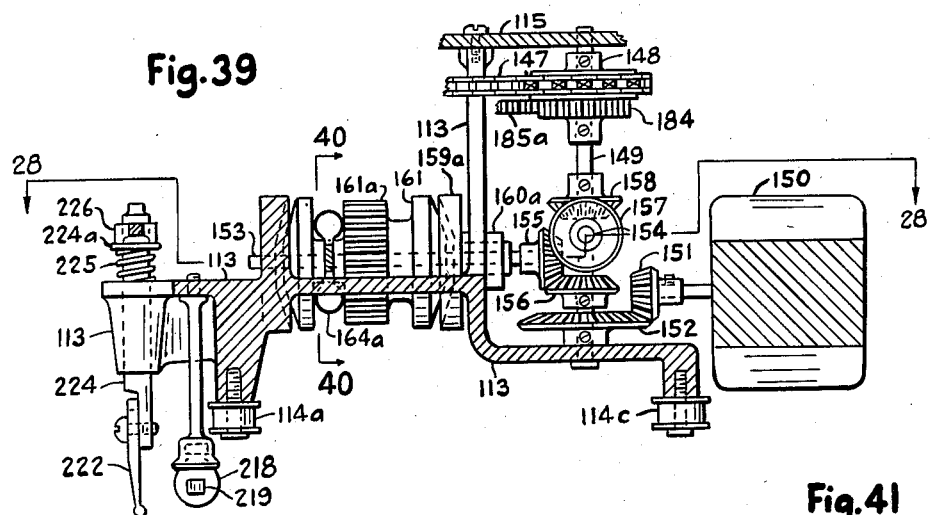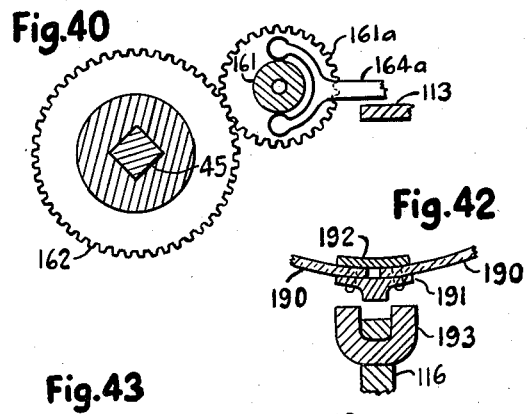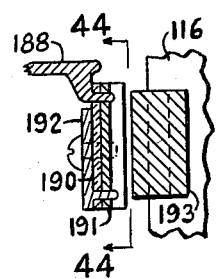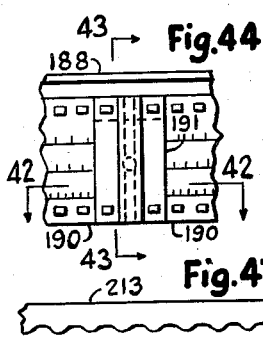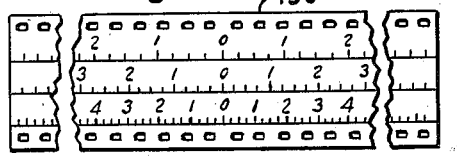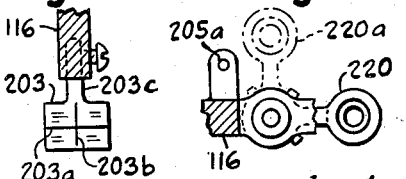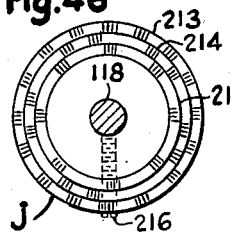

Feb. 8, 1955 P. GRAHAM 2,701,417
GRAPHIC MACHINE
Filed March 17, 1948 21 Sheets-Sheet 11

Inventor
Phillip Graham
By
William J. Ruano
Attorney

Feb. 8, 1955 P. GRAHAM 2,701,417
GRAPHIC MACHINE

Filed March 17, 1948 21 Sheets-Sheet 12

Inventor
Phillip Graham
By *William J. Ruano*
Attorney

Feb. 8, 1955 P. GRAHAM 2,701,417
GRAPHIC MACHINE
Filed March 17, 1948 21 Sheets-Sheet 13
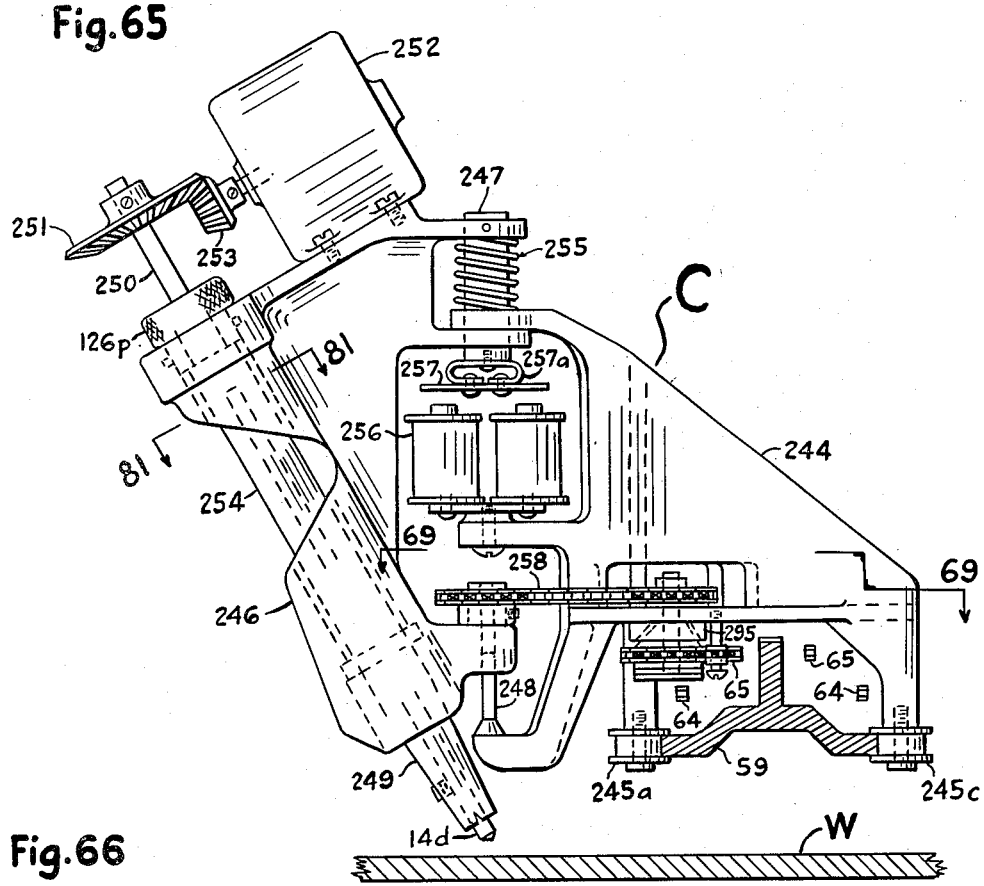
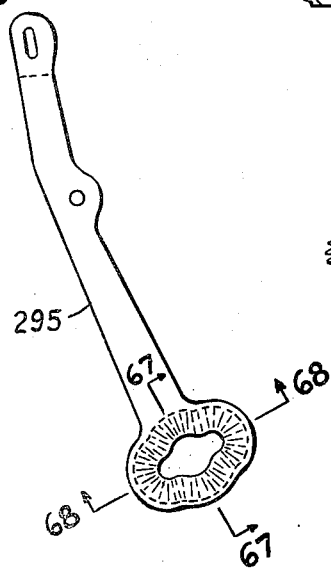
Inventor
Phillip Graham
By
William J. Ruano
Attorney Feb. 8, 1955
P. GRAHAM
2,701,417
GRAPHIC MACHINE
Filed March 17, 1948
21 Sheets-Sheet 14
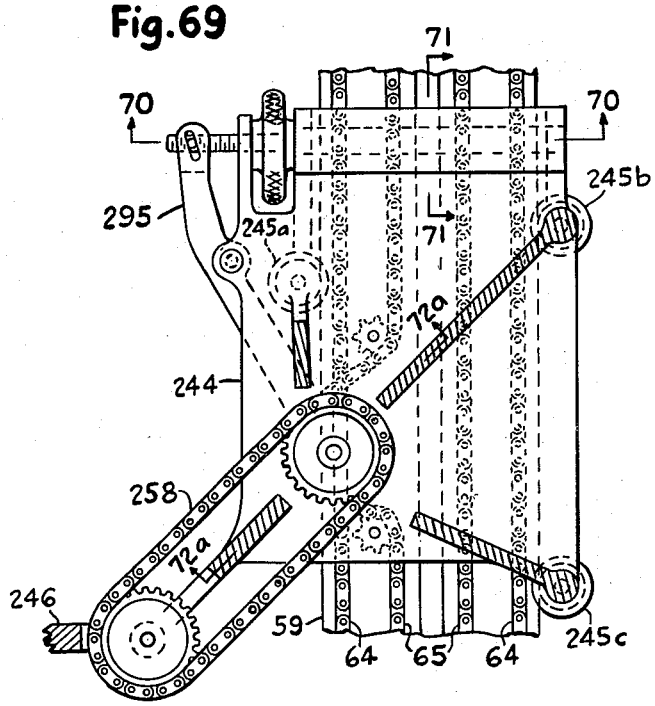
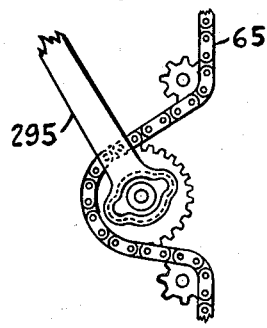
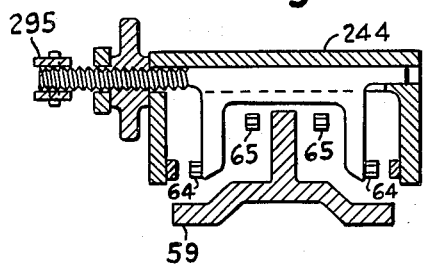
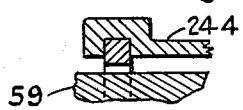
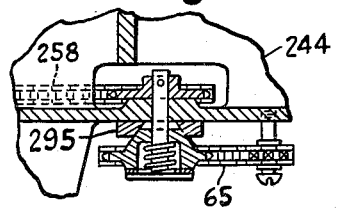
Inventor
Phillip Graham
By William J. Ruano
Attorney

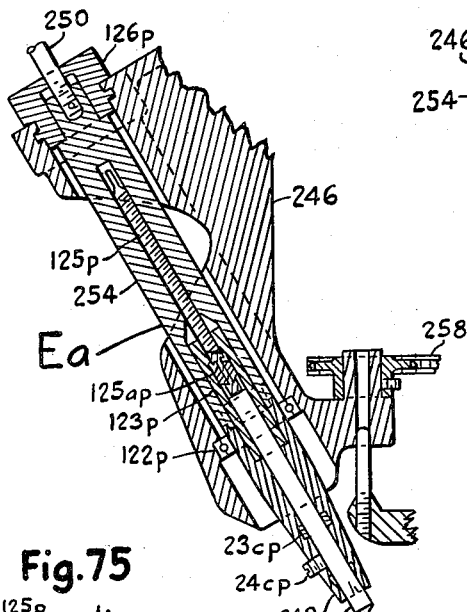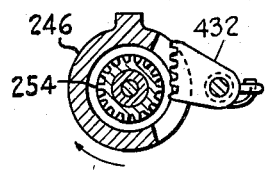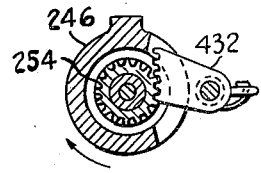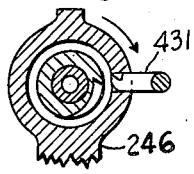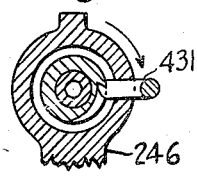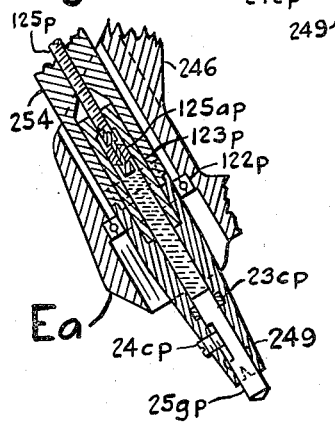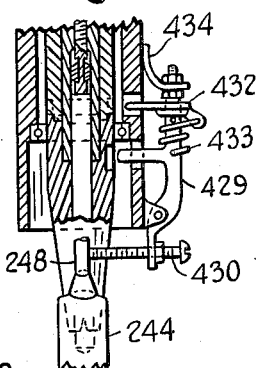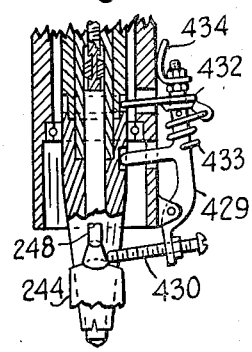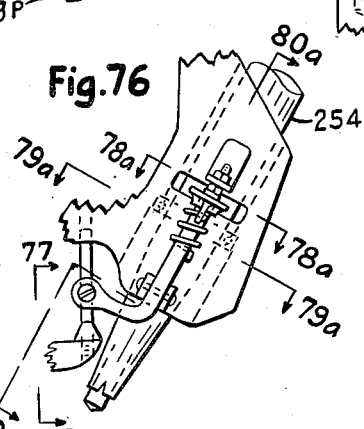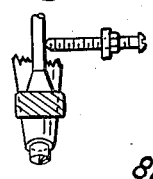

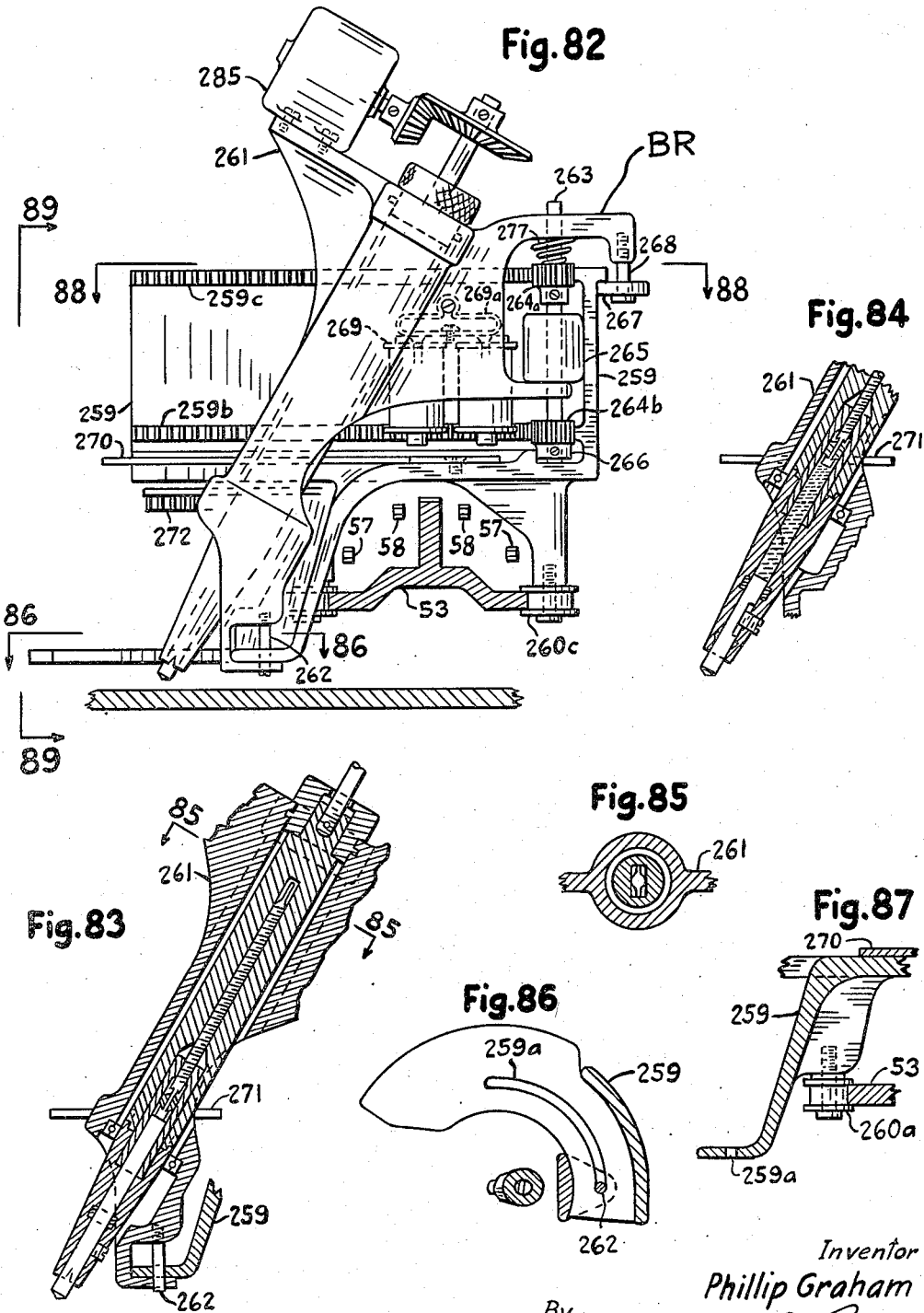

Feb. 8, 1955  P. GRAHAM  2,701,417
GRAPHIC MACHINE
Filed March 17, 1948  21 Sheets-Sheet 17
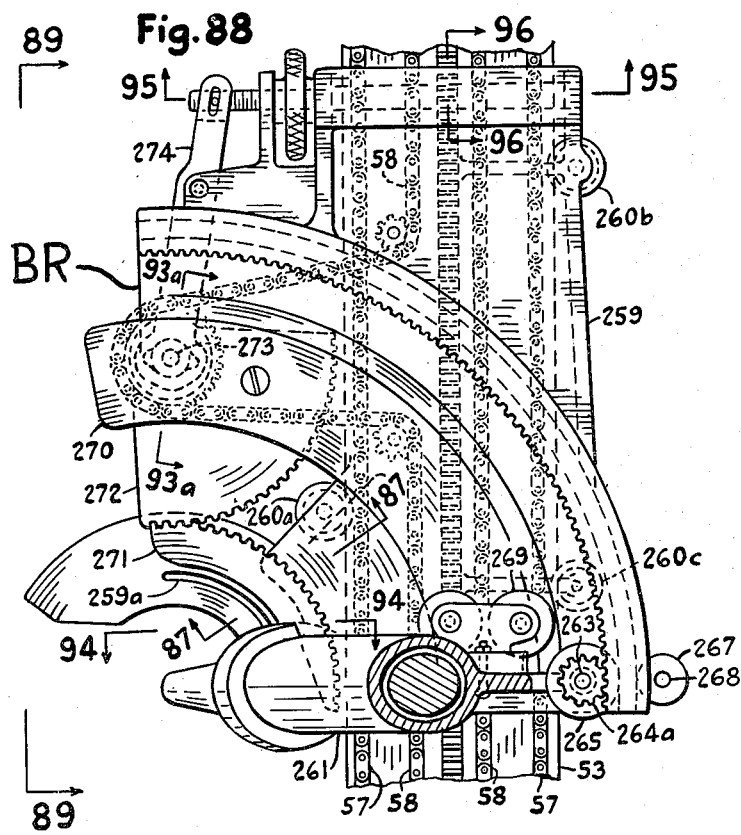
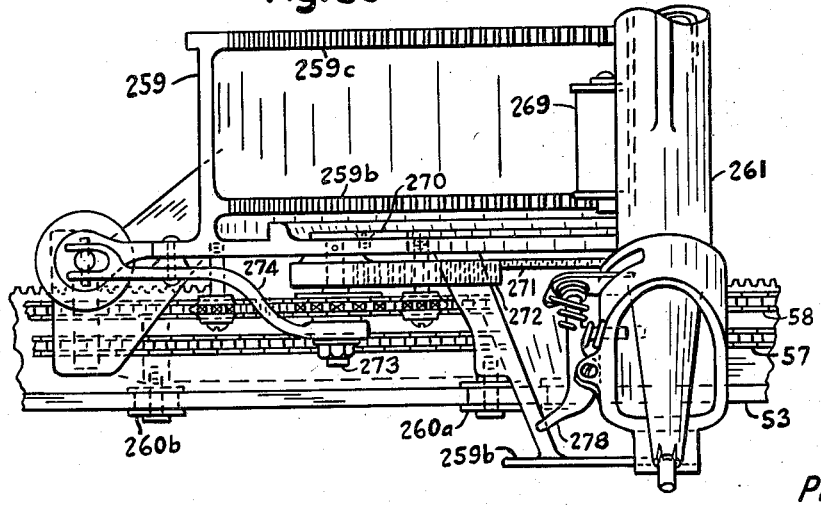
Inventor
Phillip Graham
By
William J. Ruano
Attorney Feb. 8, 1955 P. GRAHAM 2,701,417
GRAPHIC MACHINE
Filed March 17, 1948 21 Sheets-Sheet 18

Inventor
Phillip Graham
By William J. Ruano
Attorney

Feb. 8, 1955 P. GRAHAM 2,701,417
GRAPHIC MACHINE
Filed March 17, 1948 21 Sheets-Sheet 19
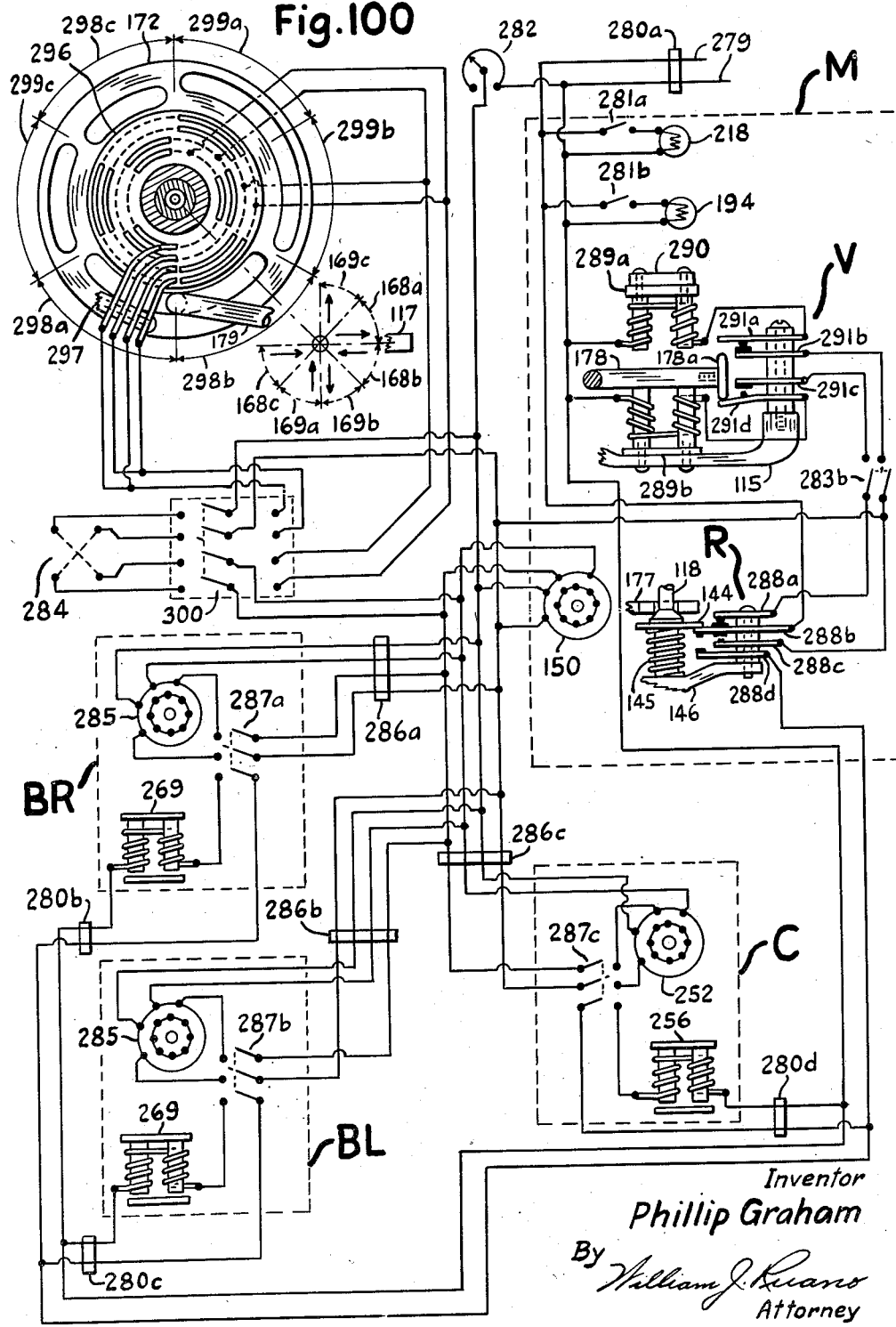
Inventor
Phillip Graham
By
William J. Ruano
Attorney Feb. 8, 1955

P. GRAHAM 2,701,417

GRAPHIC MACHINE

Filed March 17, 1948

Inventor
Phillip Graham
By William J. Ruano
Attorney

Feb. 8, 1955    P. GRAHAM    2,701,417
GRAPHIC MACHINE

Filed March 17, 1948    21 Sheets-Sheet 21

Inventor
Phillip Graham
By
William J. Ruano
Attorney

United States Patent Office 2,701,417
Patented Feb. 8, 1955

2,701,417

GRAPHIC MACHINE

Phillip Graham, Pittsburgh, Pa.

Application March 17, 1948, Serial No. 18,988

19 Claims. (Cl. 33—18)

This invention relates to a graphic machine or mechanism for drawing, laying out or tracing lines on paper or other surfaces accurately and at a rapid rate or for guiding the movements of tools on such surfaces. More particularly, it relates to a graphic machine which is fully automatic in operation, embodying a marker or tool or a stylus which continuously rotates about its own axis and has an end so shaped as to form a line contact with the paper or other surface, together with automatic mechanism for making it possible to draw straight lines of any desired width without the use of T-squares or the like. A graphic machine involving the principles of the present invention may be used also for structural fabricating layout work wherein pencil or crayon layouts are made on sheet material, such as sheet steel, aluminum, wood, glass and the like, or wherein marking is eliminated by having the graphic machine guide the working tool accurately and rapidly as in pantographs with cutting torches.

Engineering drafting technique has been essentially a manual art. Very little has been done to speed up or improve such technique or to increase the output per man hour, and very few instruments or equipments have been used successfully for speeding up the making of drawings, with the possible exception of blueprinting and other photographic reproducing machines. The small, costly output per man hour is particularly disadvantageous in times when a high rate of production is desired such as during war time. During such times, it is imperative that research and development of new products and processes be done rapidly since the outcome of modern wars is largely dependent upon the speed of research, development and production to permit early introduction of new weapons in combat. While great strides have been made in increasing production, very little has been done to speed up research and development methods. This is due largely to the high cost and low output of present day engineering, drafting and template making methods. These costs, such as in the aircraft industry, are oftentimes so prohibitive as to greatly restrict the amount of development work.

The way to speed up development of new industrial and military equipment is to speed up the work of the men who do the basic and preliminary work, namely the engineers, draftsmen, template makers, mold loftmen, etc. Much engineering work is largely drafting, and the time element involved therefor depends largely on the time it takes to put an idea on paper, the development coming only after first laying out the idea on paper so that it can be readily understood and further developed by others.

When high rates of production are required, drafting is usually the bottleneck in engineering projects and manufacture because of the slowness of normal drafting technique. It is usually not a proper solution to place an oversize force to take care of such contingency since such force often slows up rather than speeds up a job. An engineering project can be done most efficiently when the number of engineering draftsmen is kept to a minimum since, in theory, the most efficient engineering or drafting set-up is a one man force. As soon as additional engineering draftsmen are placed on a project, they must, on complicated work, spend a great deal of time studying the project so as to become familiar with its many phases. Also, after they start drawing, they must spend considerable time collaborating with the other engineering draftsmen to coordinate the work. When too many men are working on the same project, so much time is spent at collaborating that little time is left to draw, thus production is slowed up with such extra men and costs are increased. On many industrial and military projects, the time element is most important, the engineering costs being of small consequence. Thus, the speeding up of the whole project by more efficient engineering methods is highly desirable.

Much delay is involved in the frequent sharpening of pencils or in the changing from soft to hard pencils, or vice versa, and from fatigue resulting from the dull, uninteresting or tedious manual effort of making the numerous lines required in many large drawings. In many types of engineering drafting, such as structural steel, shipbuilding, sheet metal and architectural drafting, the work involved is largely a matter of how fast lines can be put down on paper, inasmuch as the brain work, calculations and reference figures, in point of time, constitute a minor part of the work. The ordinary skilled draftsman can think far ahead while drawing this type of work, and as the work progresses, he can visualize the next step, and then the next, without interrupting his drawing. These types of drawings are largely made up of straight lines which can be made rapidly with the graphic machine embodying the present invention.

An object of the present invention is to provide a novel graphic machine involving automatic features that greatly speed up the process of making lines, particularly straight lines, on paper and other surfaces on which a drawing is to be made, and thus speed up production of manufactured articles, thereby overcoming the above-mentioned disadvantages and slowness of common drafting techniques. A feature of the present invention is the employment of a stylus or stile of lead, graphite or other marking material which has a conical point, and which is rotated continuously about its axis and at an angle to the surface of the paper so that the line of contact is always made on such surface, namely one of the slopes of the conical end, which stylus is pivotable so that the line of contact may be made to assume any desired angle with respect to the direction of movement of the stylus for the purpose of obtaining different line widths.

A still further object of the invention is to provide a novel carriage mechanism permitting the drawing of lines at right angular relationship, including control means operated by tilting of the stylus assembly for preselecting the direction of movement of the stylus to either the vertical or horizontal.

A still further object of the invention is to provide a graphic machine having duplicate, quadruplicate or other multiples of styli which may be used in cases where multiple lines are to be drawn simultaneously by a single stroke of the stylus by the operator, which is not only useful in making drawings of symmetrical figures, such as I-beams, columns, etc., but in drawing lines on opposite surfaces of sheet metal, for example, or perhaps on opposite flanges of an I-beam or other structural element.

A still further object of my invention is to embody a novel scale mechanism in the graphic machine so as to project, with ease, a luminous image of any preselected scale in close proximity to the stylus so that the operator can quickly measure any line from any starting point by any of a plurality of scales without eyestrain and resulting fatigue.

A still further object of my invention is to provide a graphic machine which, through made up of a plurality of parts, is, nevertheless, exceedingly simple in operation and may be readily operated by semi-skilled labor or physically handicapped persons, such as one-armed persons, since such mechanism eleminates the necessity for handling T-squares, triangles and the like, as conventional required necessitating the use of the left hand, and eliminates excessive leaning over as would be required to see over the edge of such T-squares, particularly by short men and women. By eliminating T-squares, triangles, etc., undesirable shadows from these instruments are also eliminated, and the visibility of the working area is increased.

A still further object of my invention is to provide a drawing machine which will make better drawings, since the lines are more uniform and opaque than those normally made by draftsmen using ordinary drafting techniques, and drawings that are relatively clean since it is unnecessary to place either hands or instruments on the paper or other material on which the drawing is made which would normally result in smears. Such graphic machine will also effect a great savings by eliminating the necessity of pencils since it permits the substitution of less costly and less breakable stylus leads, therefore involving less waste.

Other objects and advantages of my invention will become apparent from a study of the following specification taken with the accompanying drawings wherein:

Fig. 1 is an elevational view of a simple embodiment of my invention showing the use of a rotating and pivotable, pencil-type stylus for making lines of preselected variable thickness;

Fig. 2 is a sectional view through the pivoted arm shown at the extreme right of Fig. 1 to more clearly show the stylus and other associated parts;

Figs. 3a, 3b, 3c and 3d are enlarged plan views of the end portion of the stylus of Fig. 1 showing the stylus disposed at different angles with respect to the direction of movement thereof to obtain different line thicknesses;

Fig. 4 is an enlarged bottom view of the stylus taken along line 4—4 of Fig. 2 and showing the line of contact 14b which the conical end makes on the paper or other surface to be marked;

Fig. 5 is an enlarged elevational view of a stylus shown in a tilted position having line contact with the surface of the drawing paper;

Fig. 6 is a cross-sectional view through the pivot arm of a modified form of stylus, that is, a liquid fed pen-type stylus for drawing with ink or other liquid;

Fig. 7 is a fragmentary sectional view through the pivot arm of a modified form of stylus, that is, a liquid fed pen-type stylus for drawing with ink or other liquid;

Fig. 8 is an elevational view of the liquid fed stylus shown in Fig. 7;

Fig. 9 is a fragmentary view of a pivot arm showing a further modification of a liquid fed stylus and assembly;

Fig. 18 is an enlarged fragmentary plan view of the brake and stops for the protractor;

Fig. 19 is an enlarged sectional view taken through the brake, track bed and protractor along line 19—19 of Fig. 18;

Fig. 20a is an enlarged fragmentary sectional view taken through the stop slot in the protractor and along line 20a—20a of Fig. 18;

Fig. 20b is an enlarged fragmentary sectional view through the stop slot similar to Fig. 20a but showing parts in a different position;

Fig. 21 is an enlarged plan view of the stop shown in Figs. 18, 19, 20a and 20b;

Fig. 22 is a longitudinal sectional view through the stop shown in Fig. 21;

Fig. 23 is an end view of the stop head portion taken along line 23—23 of Figs. 21 and 22;

Fig. 24 is an enlarged sectional elevation showing the automatic master carriage M assembly taken through the beam;

Fig. 25 is an enlarged sectional view of the master carriage M taken along line 25—25 of Fig. 24;

Fig. 26 is a fragmentary sectional view through the directional locking device, taken along line 26—26 of Fig. 25;

Fig. 27 is a sectional view taken through the directional locking device similar to Fig. 26 except showing the parts in locked position;

Fig. 28 is a partial sectional view through master carriage M taken along line 28—28 of Figs. 24, 29, 37 and 39;

Fig. 29 is a sectional elevational view through master carriage M taken along line 29—29 of Figs. 25 and 28;

Fig. 30 is a fragmentary sectional view taken along line 30—30 of Fig. 28;

Fig. 31 is a fragmentary sectional view taken along line 31—31 of Fig. 52;

Fig. 32 is a fragmentary sectional view taken along line 32—32 of Fig. 29;

Fig. 33 is a cross-sectional view taken along line 33—33 of Fig. 24;

Fig. 34 is a sectional view taken along line 34—34 of Fig. 33;

Fig. 35 is a plan view of the lever part shown in Fig. 33;

Fig. 36 is a plan view of another lever part shown in Fig. 33;

Fig. 37 is a sectional elevation through the master carriage taken along line 37—37 of Fig. 33;

Fig. 38 is a sectional view through the stylus holder taken along line 38—38 of Fig. 37;

Fig. 39 is a sectional view taken along line 39—39 of Fig. 28;

Fig. 40 is a sectional view taken along line 40—40 of Fig. 39;

Fig. 41 is a sectional view of the scale drum taken along line 41—41 of Fig. 37;

Fig. 42 is an enlarged sectional view taken along line 42—42 of Fig. 44;

Fig. 43 is an enlarged sectional view taken along line 43—43 of Fig. 41;

Fig. 44 is an enlarged fragmentary view of the scale taken along line 44—44 of Fig. 43;

Fig. 45 is an enlarged development of the multiple scale;

Fig. 46 is a view of a dotting cam J taken along line 46—46 of Fig. 37;

Fig. 47 is a side view showing the profile of the outer ring of cam shown in Fig. 46;

Fig. 48 is a side view of the profile of the central tooth cam in Fig. 46;

Fig. 49 is a side view of the inner cam ring of Fig. 46;

Fig. 50 is a cross-sectional view of the cross-hairs taken along line 50—50 of Fig. 37;

Fig. 51 is a cross-sectional view of the contour follower taken along line 51—51 of Fig. 37;

Fig. 60 is a fragmentary view of the intermittent feeding mechanism shown in Fig. 63a;

Fig. 65 is an enlarged elevational view of a secondary carriage C which may be used together with the main carriage;

Fig. 66 is a plan view of the lever included in the secondary carriage of Fig. 65;

Fig. 67 is a cross-sectional view taken along line 67—67 of Fig. 66;

Fig. 68 is a cross-sectional view taken along line 68—68 of Fig. 66;

Fig. 69 is an enlarged cross-sectional view taken along line 69—69 of Fig. 65;

Fig. 70 is a cross-sectional view taken along line 70—70 of Fig. 69;

Fig. 71 is a cross-sectional view taken along line 71—71 of Fig. 69;

Fig. 72a is a cross-sectional view taken along line 72a—72a of Fig. 69;

Fig. 72b is a view which is the same as Fig. 72a except that the clutch is shown engaged instead of disengaged;

Fig. 73 is a fragmentary view taken along line 73—73 of Fig. 72a;

Fig. 74 is a longitudinal cross-sectional view taken through the pivot arm and stylus of Fig. 65;

Fig. 75 is a fragmentary cross-sectional view similar to Fig. 74 except that it shows a modification employing a liquid fed stylus instead of a pencil-like stylus as shown in Fig. 65;

Fig. 76 is a fragmentary elevational view of an automatic feeding mechanism for the secondary stylus;

Fig. 77 is a fragmentary side view taken along line 77—77 of Fig. 76;

Figs. 78a and 78b are enlarged cross-sectional views taken along line 78a—78a of Fig. 76 but showing the parts in the disengaged and engaged positions, respectively;

Figs. 79a and 79b are cross-sectional views taken along line 79a—79a of Fig. 76 but showing the parts in the disengaged and engaged positions, respectively;

Fig. 80a and 80b are enlarged cross-sectional views taken along line 80a—80a of Fig. 76 showing the parts in the disengaged and engaged positions, respectivelly;

Fig. 81 is a cross-sectional view taken along line 81—81 of Fig. 65;

Fig. 82 is an enlarged elevational view of the secondary carriage BR;

Fig. 83 is a longitudinal cross-sectional view taken through the pivot arm and stylus of Fig. 82;

Fig. 84 is a fragmentary longitudinal view of a modified form of stylus from that shown in Fig. 83, that is, one using a liquid, such as ink, instead of a solid;

Fig. 85 is a cross-sectional view taken along line 85—85 of Fig. 83;

Fig. 86 is a fragmentary cross-sectional view taken along line 86—86 of Fig. 82;

Fig. 87 is a fragmentary cross-sectional view taken along line 87—87 of Fig. 88;

Fig. 88 is a plan view partly in cross-section taken along line 88—88 of Fig. 82;

Fig. 89 is a side view taken along line 89—89 of Fig. 82;

Fig. 90 is a plan view of the lever arm 274 included in Figs. 88 and 89;

Fig. 91 is a cross-sectional view taken along line 91—91 of Fig.90;

Fig. 92 is a cross-sectional view taken along line 92—92 of Fig. 90;

Fig. 100 is an electric wiring diagram showing the electrical circuit embodied in the aforesaid described automatic drafting machine;

Figs. 103 to 109, inclusive, are enlarged fragmentary elevations taken near the stylus of carriage M (see Fig. 24) wherein various types of tools are substituted for the rotatable conically ended stylus 14c shown in Fig. 24.

Figure 14:
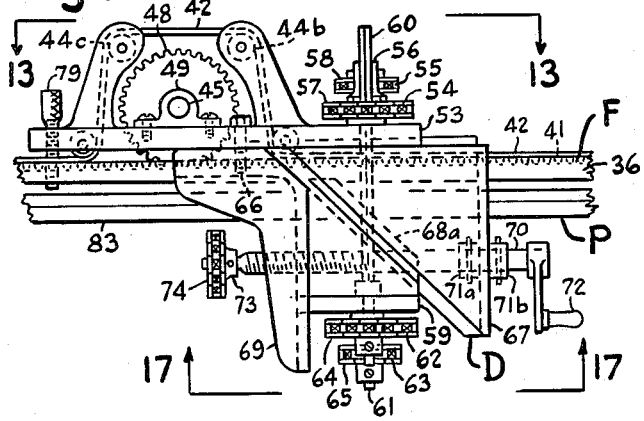
Fig. 14 is an enlarged fragmentary end elevation taken at the beam end along line 14—14 of Fig. 10.
Figure 17:
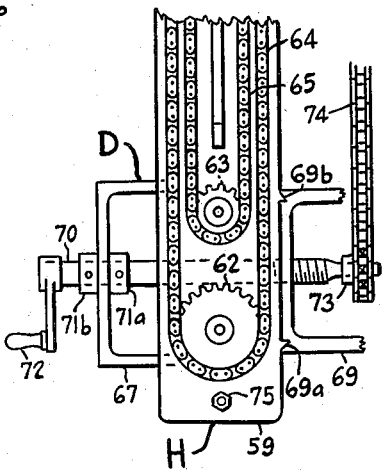
Fig. 17 is an enlarged fragmentary view of the secondary beam taken along line 17—17 of Fig. 14.
Figure 103:
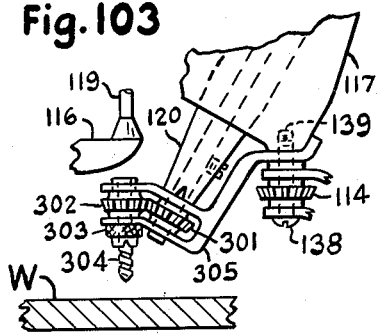
Figure 107:
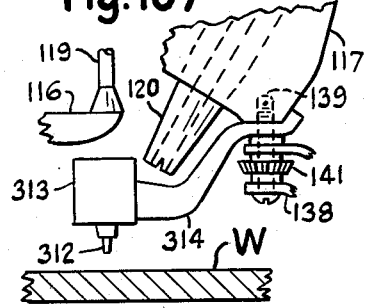
Figure 109:
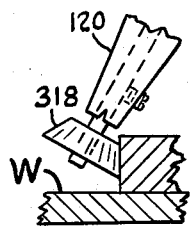
Figure 104:
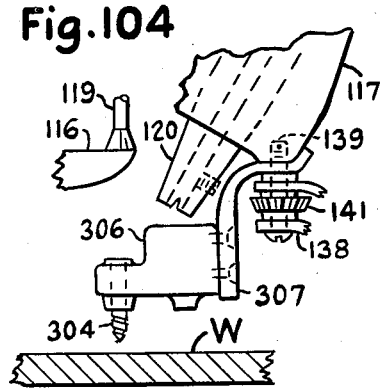
Figure 105:
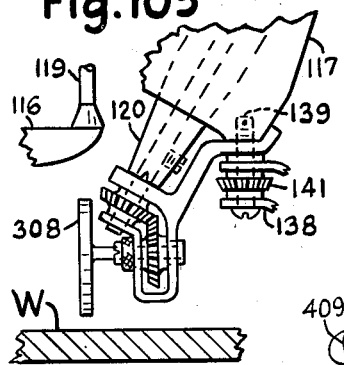
Figure 110:
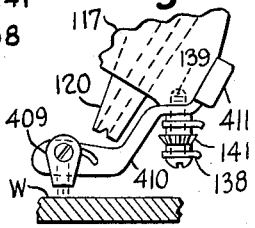
Figure 106:
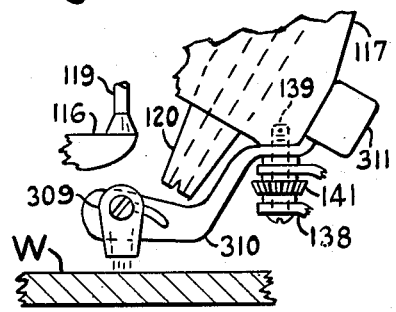
Figure 108:
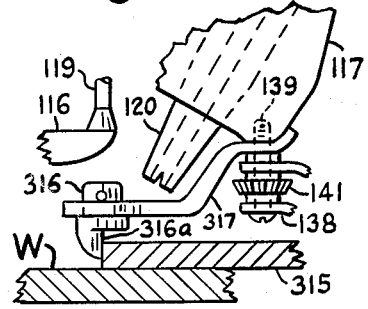

More specifically:

Fig. 103 shows a modification wherein a rotatable marking device is used in place of the conically ended stylus;

Fig. 104 shows a modification wherein a motor-driven chuck is substituted for the rotatable stylus of Fig. 14;

Fig. 105 shows a further modification wherein the driven part is turned 90° and a grinding wheel is driven thereby;

Fig. 106 shows a still further modification wherein a nozzle fed by ink or other liquid is used in place of a rotatable, conically ended stylus;

Fig. 107 shows a still further modification wherein a vibrating or reciprocable marking device or tool is substituted for the conically ended stylus;

Fig. 108 shows a still further modification for a follower which can be used on master carriage M or a secondary carriage to follow the contour of a template of master piece;

Fig. 109 shows a still further modification in which a grinder, cutter or other tool is used in place of the rotatable stylus, and Fig. 110 shows a still further modification wherein a nozzle fed by inflammable gas is used in place of a rotatable, conically ended stylus.

*Simple form of graphic machine with rotating stylus*

Fig. 1 shows a very simple form of graphic machine which illustrates the general principles of a stylus or stile embodying my invention. The machine may be supported in any desired position such as vertical, horizontal or tilted. A baseboard or workable surface 1 has a spindle 2 fastened to it by suitable fastening means, such as screws 2a. Alternatively, the spindle 2 may have sufficient weight to keep it stationary. Or, if base 1 should be made of steel, the base of spindle 2 may have permanent or electro-magnets in it (not shown) to hold it stationary by attraction to baseboard 1. The base may be fastened to the knob at the center of the protractor of a conventional drafting machine. Arm 3 is pivotally supported by spindle 2 and is free to turn or hinge on the spindle axis. Arm 4 is supported on and pivotally connected to arm 3 by means of a bolt 5. Arms 3 and 4 are free to pivot or hinge on bolt 5. The cross section of arms 3 and 4 are preferably in the shape of an "I" as more clearly shown in Fig. 6. Pivot arm 6 which embodies a housing or stylus holder or casing 12 is connected to arm 4 by shaft or bolt 7 which is screwed to casing 6 and is free to pivot or turn on shaft 7, also to slide axially on shaft 7. Spring 8 exerting an upward force on the head of bolt 7 normally lifts arm 6 when the stylus is not depressed by the operator. A motor 9, which may be reversible, is rigidly fastened to arm 6. Bevel gear 10 is fastened to the motor drive shaft by a set screw 10a, for example. Bevel gear 11 is fastened to stylus holder 12 with set screw 13. Bevel gear 11 has a knurled collar 11a for manual gripping when it is assembled or removed.

As shown more clearly in Fig. 2, stylus holder 12 is supported by and revolves in bearing surfaces of arm 6 when motor 9 is operating. Hole 12a in holder 12 is slightly larger than stylus 14. Stylus 14 is shown as a round bar, but it could be square, hexagonal, etc., if the adjoining parts were made to suit. A knurled nut 15 is used to squeeze or contract the split or pronged opening in holder 12 so that stylus 14 is held firmly. This prevents stylus 14 from falling out or turning in hole 12a. Ram 16 is threaded and it screw threadedly engages the upper end of holder 12. Knurled knob 17 is keyed to ram 16 with a set screw. Ram 16 is turned by knob 17 to adjust the amount of projection of stylus 14 from opening 12a. This can be done only after nut 15 has been loosened. Nut 15 is tightened or loosened by gripping and turning the knurled part thereof while holding knurled collar 11a.

In the operation of the machine, the drawing paper is fastened to the top of board 1. Drawing paper can be readily fastened to a hard surface with drafting tape or clamps which can be used for most materials. The area within the radius of the stylus 14 from the spindle 2 is the working area. Pivot arm 6 is held or grasped in the same manner as a pencil, and downward pressure is applied thereto so that stylus 14 touches the paper and is in readiness to draw a line. With the motor 9 running so that stylus 14 is revolving on its axis, arm 6 is pulled or pushed while it is being held at any selected pivot angle 18 relative to the direction of movement of the stylus which will control the width of line 19 that is being drawn. As the pivot angle 18 increases, the width of line 19 increases, but not at the same ratio.

Figs. 3a, 3b, 3c and 3d are enlarged plan views showing different line widths 19 obtained by different pivot angles 18. Fig. 3a shows the maximum pivot angle 18 which represents an angle of 90° between the stylus axis and the direction of movement of the stylus point which will give a maximum width of line 19 which is equal to the slope of the stylus point, that is, that part of the conical end 14a of stylus 14 which comes in contact with the workable surface or drawing. Figs. 3b and 3c show intermediate width lines 19 and pivot angles 18. Fig. 3d shows the minimum width of line 19 which is obtained when the pivot angle 18 is 0°. Arrows 20 show the direction of movement of the pivot arm 6 and the stylus 14. Angle 21 shown in Fig. 1 representing the inclination of the conical surface of stylus 14 is, for example, about 60°. Pivot arm 6 is built so that the stylus 14 tilts about 30° with respect to the vertical shaft 7. The pivot arm 6, as will be apparent, could be made to hold the stylus 6 at a different angle than that shown. An angle of 30° is suitable for most drafting work when stylus 14 is 1/32" or 1/16" thick. This arrangement results in an angle of 60° for angle 21. In drafting it is considered poor practice to push a pencil or pen while making long lines since the point may snag the paper or tracing cloth and rip it. Since this angle 21 is only about 60° in the embodiment shown, the stylus has a tendency to iron out any buckle in the drawing when it is being pushed, thus preventing snagging. The graphic machine may be used to draw a line 19 either free hand or with a guide or straightedge such as a triangle, T square, irregular curve, circle guide or lettering guide. Also, it may be fastened to a compass to draw arcs and circles.

The line of contact 14b of the conical end 14a of stylus 14 constantly wears away while a line is drawn. But the constant turning or spinning of the stylus 14 about its axis keeps this wearing action uniform, hence the shape of the conical end 14a remains the same shape, that is, conical, and is therefore always ready to use. Since any thickness of line 19 may be drawn merely by selectively pivoting stylus 14 with respect to the direction of movement thereof, as shown in Figs. 3a, 3b, 3c and 3d, it is obvious that the stylus 14 is, in reality, self-sharpening as compared to ordinary pencils.

When the stylus 14 wears down, nut 15 is loosened and the knob 17 is turned to advance the ram 16, feeding the stylus 14 out of holder 12 until the desired projection is obtained. Then the nut 15 is tightened.

The grinding action of the stylus 14 as it moves against the surface of paper or other material tends to wear off the substance forming stylus 14, making a dense, opaque line 9 that is firmly impressed into the paper and that will not readily scale or rub off with constant handling as pencil lines on paper usually do when little pressure is applied in making them.

Since a relatively thin line can be drawn with stylus 14, much less breakage of stylus 14 would be had in comparison to the breakage of common pencil points that have been sharpened to make an equally thin line because of the larger diameter and inherent structural strength of stylus 14. Sharp common pencil points are so thin and fragile that they easily break when a much smaller pressure is applied than that which stylus 14 can safely withstand. A high pressure on stylus 14 helps to make opaque lines and impress them deeply into the paper. Since a larger diameter stylus 14 can be used to draw a fine line, a softer grade of stylus, such as soft pencil lead, can be used to make fine opaque lines with much less wear due to the large line of contact 14b in comparison with the conventional sharp pencil point which has a very small line or almost point of contact with the drawing paper and consequently wears down rapidly. Most draftsmen use the hardest pencil that can be used to make an acceptable drawing just to eliminate frequent sharpening of pencils. In doing so, they make lines that do not reproduce clearly in blueprinting; also variations in widths of lines is poor. As hard and soft pencils are usually used to obtain variations in lines, the lines are often made the same width. The harder pencils being used for light lines do not leave as much residue on the paper and consequently print a little lighter, but some printing processes increase the contrast of a print over the original drawing, making all lines look about the same thickness.

Stylus 14 works best in drafting with a hard board and a thin drawing paper. The hard board prevents embossing of the lines, which embossing is objectionable in several ways. Embossing has a tendency to stretch, curl and buckle the drawing, resulting in poor contact in blueprinting by blurring and uneven reflections when photographing.

On some types of drawing paper, such as vellum which is transparent, oiled and sensitive to the slightest bit of dirt in blueprinting, the embossing of lines by common pencils is a source of constant trouble since the oil in the paper tends to retain the dirt on the embossed lines on the back of the drawing. When revisions are made on a drawing, the drawing must be erased on both sides. If the dirt is not removed from the back of the drawing at a revision, it reproduces the void lines in blueprinting. If a drawing of this type is handled frequently, it must be periodically cleaned on the back to remove the dirt it gathers on the void embossed lines.

A common pencil does not work as consistently as stylus 14 in combination with a hard board and a thin drawing. Stylus 14 contacts the drawing continuously along line of contact 14b which allows the operator to make a thick or thin line, whereas a common pencil point is constantly changing its shape since it is difficult to try to hold the pencil at a constant tilting angle, revolve it, and push or pull it at the same time. The result is that with a common pencil inconsistent line widths are usually obtained.

A very soft graphite lead pencil and some types of colored lead pencils have a tendency to crumble when sharpened and used with normal pressure applied. Stylus 14 when made of such material is much stronger and it is practical to employ normal pressure to make any width of line. Colored line drawings are ideal for many types of graphic work. The inability to make a stylus point that can make thin lines without breaking under normal working conditions or pressures has held back the use of colored drawings in engineering. Color printing processes are now in use for engineering drawing reproductions. Colored line engineering drawings are so much easier to read than blueprints, etc., that for intricate drawings, they more than pay for the additional cost of printing by the time saved in deciphering the drawings. Stylus 14 may be made of wax or grease crayon, such as china marking pencils, which are very soft and are rather thick to enable them to stand up under working conditions, and which can be used to make thin lines in shop layout work on highly polished or smooth surfaces without scratching or marring the surface. Some of the surfaces that can be marked with this type of stylus 14 are polished steel, aluminum, glass, galvanized surfaces and plastics.

In shop work, in particular, it may be advantageous to keep the revolving stylus 14 stationary and have the workable surface move along in contact under it. In this way the operator could lay out large or small surfaces without moving from a fixed position.

Of secondary importance and only under certain conditions, the width of a line can be varied by varying the speed of the motor. When a line is drawn as in Fig. 3d with a normal or standard rotor (stylus) speed and the stylus is moved in a given time over a given distance, a light or narrow line is made. But if the rotor (stylus) speed is slowed down greatly, or if the length of time to draw a given line is greatly speeded up while the stylus speed remains normal, more friction is developed by rotating the stylus over the paper surface, which friction causes excessive wearing away of the stylus contact surface, thus producing a broader contact surface on the conical surface, which makes a broader line. This error would decrease for the stylus position shown in Fig. 3c, and still further for the stylus position shown in Fig. 3b and would be negligible for that shown in Fig. 3a.

For most work, to obtain consistant results, a soft stylus or lead is rotated at a predetermined normal speed (R. P. M.) and the stylus is moved over a given course at a given time to produce dense variable width lines.

Changing the ratio of the speed, number of revolutions of stylus per minute (R. P. M.) for drawing a given length line, such as one foot, in a given time of one-half second will change the character of the line. The rotational speed of the stylus distance travelled and time of travel are all related. By slowing down the R. P. M. of the stylus or by speeding up the time of drawing a given line, the slight flat spot on the conical surfaces broadens and thus a broader line is drawn. To a certain extent, variations in rotor (stylus) speeds, materially vary the thinner (narrower) lines only.

Variations in the widths of lines can be obtained by regulating the speed of the motor 9 so as to speed up or slow down the revolutions per minute of stylus 14. This can be done with a rheostat or other speed regulating means. The slower the revolving speed of stylus 14, the wider the line 19 will be. Since the pressure on the stylus 14 causes it to wear away, the slower the stylus 14 revolves, the more wear at the contact surface 14b. The wearing increases the contact surface 14b and the contact surface width is the width of the minimum line. It is an advantage in some types of work to increase the minimum width of line, such as in lettering, when extreme variations in line widths are not wanted in making lettering while holding the pivot arm at a constant pivot angle 18 to a line of lettering. This results in obtaining letters of varying thickness, such as Roman lettering.

The motor 9 is preferably reversible so as to allow more accurate and consistent work when it is required, such as when wide lines are being made when using a large pivot angle 18. Since the amount of friction between the stylus 14 and the paper or workable surface determines the amount of wear or residue that marks the paper, the opaqueness or density of the line is increased as the residue or friction is increased. When a wide line 19 is drawn, the conical end 14a of the stylus is revolving so as to roll in the same direction as line 19 is being drawn or it may be revolving in the opposite direction, thereby causing considerably more friction at the contact surface with the paper. Since the more friction, the denser the line, it can be seen that the direction the stylus 14 revolves in relation to the direction of the movement of the stylus 14 directly affects the density of a line 19 which is being drawn, except when a minimum width line is being drawn as shown in Fig. 3d. When the stylus 14 is revolving at high speed, in relation to the speed of travel of the stylus, the difference in widths of lines is only slight when stylus 19 is kept revolving in the same direction and the lines are being made from either right to left or left to right.

When mistakes or revisions are made in graphic work, it is a decided advantage to be able to erase the areas that are being revised without disturbing the adjoining lines. When an erasing type rubber stylus 14 is used, it is possible to erase in a narrow area due to the small line of contact 14b. Motor driven erasers are in common use, but it is difficult to hold them at a constant angle, hence the bearing surface is not as constant as the line of contact 14b.

Since there is little possibility of breaking a stylus 14 as it is being used, and all except a tiny end is used without waste in making lines, it is obvious that it is more economical to use than the common pencil, since the common pencil is more costly than a lead (graphite) stylus and much of the common pencil is wasted in breakage and sharpening. Furthermore, one grade of hardness of a stylus 14 can be used to make all weights or widths of lines on a drawing whereas a variety of grades of common pencils must be used to do the same.

It would be advantageous if the outside of stylus 14 at the nonwearing end were marked with a contrasting color for a short distance so as to warn the operator to refill the stylus holder 12.

Since it is possible to make dense or opaque lines of all widths with a stylus 14 without excessively indenting or stretching of the paper or workable surface, it is possible to make drawings on some thin surfaces which would be more practical for photocopying (microfilm) and for photoengraving than would ink drawings since in buckles thin papers and cloth and the buckles do no reflect light evenly therefore reproducing imperfectly Stylus 14 when made of chalk or crayon is of decide usefulness in laying out a surface of material to b fabricated, especially in structural steel fabricating shops The layerouts who mark the steel for various operation such as location of holes and cuts, use sticks of chal which must be sharpened frequently by rubbing again a rough surface. These sticks of chalk must be sharp t mark the steel accurately. The rough scale on the stee causes the chalk to wear away quickly and considerabl time is therefore spent in sharpening the chalk.

The stylii 14 that have been described so far hav been softer than the workable surface or drawing to b marked. The stylus 14 may be made of a harder sut stance than the workable surface which is to be marke or laid out. A hard stylus 14 may be a hard substanc throughout, or the conical working surface 14a may b covered with a hard substance. A hard stylus 14 mad with the conical surface 14a impregnated with diamon dust would make it suitable for marking the surface c glass, hardened metals, etc. A hard stylus 14 wears dow or grinds the workable surface in marking it. A carbid tipped stylus may be used to mark hard surfaces. Th wear would be even with a stylus 14 type. A hard stylu 14 made of abrasive stone could be used to mark or cu into almost any surface. A stylus having a sand impreg nated conical surface 14a could be used to mark an score plastics, wood and other soft materials.

A stylus 14 with the conical surface 14a cut to forr fine burrs similar to dentist's burrs could be used to mar by scoring and cutting materials such as wood, plastic cardboard and paper. In making paper templates, th type stylus would eliminate an operation since it coul be cut without marking beforehand.

A plain stylus made of steel or other hard materia could be used to impress the various width lines of completed sketch that is being reproduced below th original with the aid of carbon paper onto another draw ing. This type of stylus could also be used to mak variable width lines on a wax stencil such as those use on a "mimeograph." A solid metal stylus with a heatin means could be used to mark wood, etc., by burning slightly.

Gasket 22 on ram 16, gasket 23 in stylus holder 1: and set screw 24 in stylus holder 12 are necessary whe using the liquid fed stylus 25 which is shown in Fig. and Fig. 8.

Fig. 7 is a fragmentary sectional view through pivot ar 6 showing a liquid-fed stylus. The part broken off and n shown is the same as in Fig. 2. Gasket 22 which molded or stretched over ram 16 is slightly larger tha hole 12a in stylus holder 12 so that it will compre slightly and fill up the hole 12a, thus preventing an liquid 26, such as ink, from leaking. Gasket 23 preven any liquid 26 from leaking since the inside diamet thereof is smaller than the outside diameter of styli 25, thus making a tight fit. Stylus 25 is made of liqui porous material. When the liquid-fed stylus 25 is i serted in hole 12a of stylus holder 12, the nut 15 is fir removed. This allows room to turn set screw 24 so th it projects into hole 12a and notch 25d in stylus 2 The set screw 24 prevents stylus 25 from turning hole 12a or falling out of hole 12a, but set screw 24 not tightened against stylus 25, since the stylus must t free to slide in hole 12a until the set screw 24 touch the end of notch 25d. After set screw 24 is adjuste the nut 15 may be replaced and tightened only enoug to bring the pronged end of holder 12 in slight conta with stylus 25. Stylus 25 operates to a certain exte in the same way as stylus 14 of Figs. 1 and 2. It is the same size, and the shape of the conical end 25a similar to that of surface 14a. The line of contact 25 is similar to line of contact 14b. The action of styli 25 and stylus 14 are similar in respect to their conta with a drawing or workable surface.

Liquid porous stylus 25 is useful for drawing fine line such as in drafting, layout work to be fabricated ar art work, and could be made of a hard porous substanc for example, porous metal such as "Oilite" which ma be of metals such as steel, bronze or aluminum. It ca be made of different degrees of porosity. A poroi ceramic stylus 25 may also be practical. The conical er 25a may be cast or ground to the exact conical siz The notch 25d and the hole 25c are cut in stylus 25. Hole 25c by-passes and speeds up the flow of liquid through the stylus. The cylindrical outside surface of stylus 25 and the surface of the notch 25d are impregnated with a nonporous, liquid-proof substance to prevent leakage of the liquid 26 through these surfaces.

In using the graphic machine with stylus 25 instead of stylus 14, the principles of operation are generally the same, except that the stylus 25 does not wear away. The stylus 25 which may be made of non-corrosive material such as porcelain is used to draw with ink, paint and other liquids such as bleaching solutions for marking blueprints, other bleaching solutions for removing lines from other different types of prints used in engineering and photographic work, and acids, such as sulphuric acid for marking steel or etching metal.

To fill up the stylus 25 and the reservoir between the top of the stylus 25 and the bottom of the ram 16 with fluid or liquid, collar 11a is held and knob 17 is turned until ram 16 touches the top of the stylus 25. Stylus 25 is now dipped into an ink bottle or container holding the liquid to be used. The stylus 25 should be lowered into the liquid until the conical end 25a is submerged. Collar 11a is then held and knob 17 is turned which raises the ram 16, leaving a cavity which is almost a vacuum. The liquid 26 will be drawn through the porous conical surface 25a to fill this cavity which shall be referred to as the reservoir. When the reservoir is filled, pivot arm 6 is lifted so that stylus 25 is above the liquid container. Collar 11a is now held and knob 17 is turned until the stylus 25 is forced down by the hydraulic pressure until set screw 24 prevents further movement of stylus 25. A tight fitting liquid-tight cap could be slipped over the end of stylus 25 when the machine is not being used. The liquid-tight cap could be kept over the conical end of stylus 25. This would prevent excessive seepage of the liquid through the porous stylus 25 and prevent drying and clotting of the liquid on the porous surface 25a. When the machine is to be used, the cap is slipped off the end of the stylus 25 and the excessive residue wiped clean.

The operation of stylus 25 is similar to that of stylus 14. The manual pressure exerted on pivot arm 6 to force it down with stylus holder 12, creates a hydraulic pressure in liquid 26. This pressure forces the liquid through the bottom of the porous stylus 25. The porous surface 25a is slowly permeated by the liquid 26. As the stylus 25 revolves, the liquid on the outside of surface 25a is wiped off onto the drawing or workable surface that it is contacting. The hydraulic pressure from within the stylus 25 tends to keep the pores open in conical surface 25a, thus preventing dirt, lint and dried ink from clogging the surface. The greater the manual pressure on pivot arm 6, the greater the flow of liquid. When a certain quantity of liquid has been used up, the stylus holder has slid down on shaft 7 and stylus 25 has slid until the end of slot 25d touches set screw 24 to limit the movement of the stylus. The machine must now be stopped and the ram 16 is again operated so as to push the stylus 25 to its extreme lower position. Now the machine may be restarted. When the pivot arm 6 is raised, the liquid pressure drops as the stylus 25 freely slides to a lower position.

The stylus 25 may be pushed or pulled by manual operation of arm 6 the same as stylus 14. When drawing other than the thinnest lines, it may be desirable to control the motor so that the stylus 25 does not roll in the direction that the line 19 is being drawn. This reverse rotation of the stylus 25 makes the liquid (ink, etc.) wipe off the stylus 25 onto the drawing forming a line 19 after the line of contact 25b has passed. If the stylus 25 were rolling in the same direction as the line was being drawn, the conical surface 25a would deposit the liquid on the drawing and then the line of contact 25b would roll through the fresh accumulated liquid, pushing the excess liquid aside and making the line 19 of irregular width.

Some of the advantages of stylus 25 over commonly used inking pens are that lines may be made any width from thick to thin without delay in setting the instrument. The stylus has little tendency to snag the surface when being pushed or pulled. Stylus 25 is nonclogging and is easily cleaned. It has a large reservoir of liquid which is free from the atmosphere and cannot readily dry out. Thick and thin lettering can be easily made with minimum effort.

Fig. 9 is a fragmentary view of the pivot arm showing a modified form of stylus for ink or liquid lines.

This modification is similar to the mechanism shown in Fig. 2. In addition, it has a reservoir 27 for ink or other liquids that can be used in graphic work, and a fibrous wick 28 to carry the ink to the stylus conical surface 29a of stylus 29. The reservoir 27 is supported and connected to pivot arm 6 by bolt 30. The reservoir 27 has a hole 31 through which the wick 28 passes. A resilient support 32 holds wick 28 in contact with surface 29a. Support 32 is fastened to reservoir 27 with a bolt 33. A bolt 34 with a gasket can be removed to allow a medicine dropper to be used to fill reservoir 27 with ink or other liquids 35. The threaded plug and gasket 27a are removed for access to clean reservoir 27 or to fill the reservoir when the graphic machine is being operated in a vertical position or tilted position.

In operation, the liquid 35 is carried by capillary attraction through the wick 28 to the conical stylus surface 29a. The stylus 29 revolves and the liquid 35 is wiped off the stylus at the line of contact 29b onto the drawing or workable surface to form a line such as 19. A stylus 29 made of hard material has conical end 29a cut in it. It is used with ink or liquids 35 that are being transferred to the drawing.

A modification may be made using the same parts except the hard stylus, ink and other liquids used in marking or eliminating graphic lines. Such modification may embody a stylus 29 made of material such as indelible pencil leads. Indelible leads can be had in all colors. The reservoir may contain water or other liquids that would be carried to the stylus surface 29a and soften the surface so the surface will rub off when it contacts the paper or other workable surfaces as the result of rotation of the stylus, thus making a semi-liquid line which would be more durable.

*Complete automatic graphic machine*

Figure 10:
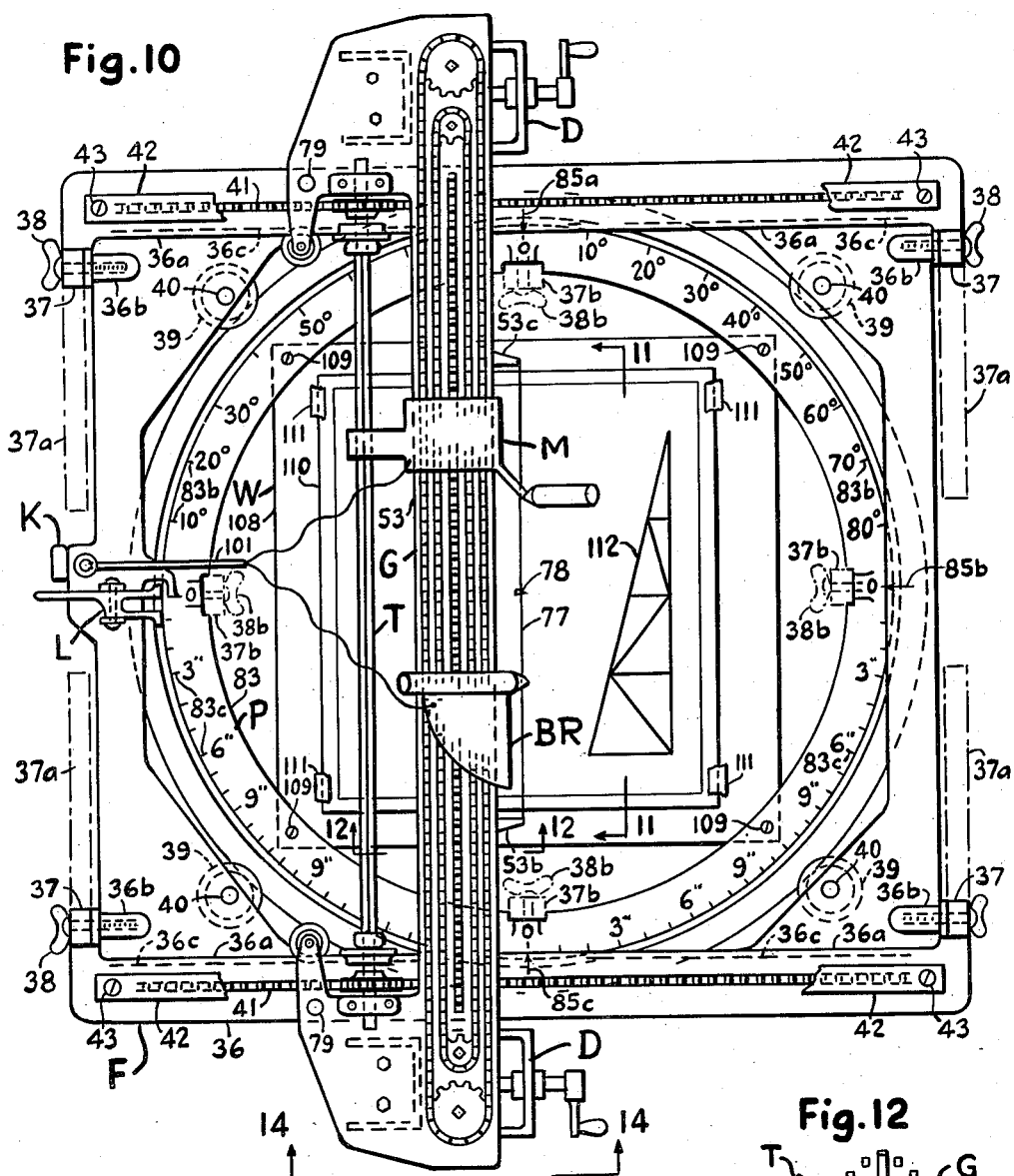
Fig. 10 is a plan view of a modification showing a completely automatic graphic machine embodying the principles of my invention.

Fig. 10 is a plan view of a complete, automatic graphic machine, a right-hand machine being shown. The graphic machine consists of a supporting frame F which has two parallel tracks. These tracks have racks 41 as parts of the rails. The frame F supports a movable shaft T. This shaft is square and has wheels and gears which engage the rails on frame F, thus maintaining perfect alignment. Frame F and shift T together support a movable beam G which is in some respects a straightedge. Beam G supports a master carriage M and a secondary carriage BR. The edges of beam G serve as a track for carriages M and BR.

Master carriage M supports a synchronized mechanism which includes a similar stylus and a means for using it to draw various width lines—it also includes a means for automatically locking either carriage M to beam G to prevent movement of carriage M along the beam or the locking of shaft T to prevent any movement of beam G when a selective width line is being made and includes means to control and operate a secondary carriage BR by engaging carriage M to the two chains on beam G, carriage BR also being engaged to these same two chains. Carriages M and BR can be controlled so as to make it possible to draw duplicate sketches or pairs of sketches, that is, right-hand and left-hand views, simultaneously. The means to make intermittent lines may be mechanically controlled for this purpose. Other mechanisms aid in making curved, circular and irregular lines. An illuminating light is part of master carriage M. The operator or draftsman usually operates carriage M with his right hand.

The frame F has four supports 37 at the corners. These supports may be used as legs, hangers or brackets so as to support the machine clear of obstructions. Frame F has four grooved wheels 39 which support a protractor ring P so that it can be rotated 360°. A protractor locking mechanism L is supported on frame F. The ring P supports the rectangular board or workable surface W with four bolts at the corners of the board. The board W supports the drawing which is fastened with drafting tape or other suitable means. Board W may also be made of a transparent or translucent material, such as glass, then much of the illuminating light can be placed behind the board, thus obtaining even, shadowless illumination. The frame F supports an electrical control board K near locking mechanism L. This arrangement allows the operator to work the controls on master carriage M with his right hand while his left hand controls board K and locking mechanism L.

A brief outline of some of the operations of the structure described is as follows: The operator controls, through carriage M, the movement of the stylii to make lines parallel to beam G—shaft T and beam G being automatically locked while these lines are being made by movement of carriages M and BR. Lines perpendicular to beam G are made through controls on carriage M by locking or restraining carriages M and BR from moving along beam G. This locking is automatic with the selected indexing of the stylus on master carriage M. Beam G and shaft T are free to move and they move parallel to racks 41 carrying carriages M and BR and their stylii which are marking the drawing.

Lines diagonal to those already drawn are made by revolving protractor ring P to the desired angle, locking ring P with locking mechanism L and drawing lines parallel or perpendicular to beam G, as already described. When only one line is required, the second carriage BR is controlled from control board K or carriage M so as to prevent it from operating. Carriage BR may be disengaged fom chains and controls K when not required for a long period.

In Fig. 10 carriages M and BR are shown spaced an equal distance from the center of board W. However, either or both carriages M and BR can be disengaged from chains, moved and reset in a few seconds to any desired location along beam G.

A secondary beam H located on the under side of frame F and board W in exact alignment with beam G is supported by such beam G. Beams G and H are connected with adjustable diaphragms D. Beam H supports secondary carriages C and BL corresponding to carriages M and BR, respectively. Carriage BL is left of carriage BR. Beam H has movement chains similar to those on beam G, but no rack (see Fig. 11). The chains on beams H and G are supported on sprockets at the ends of the beams. The sprockets on beam G transmit their movements to the spockets on beam H as they are both keyed to the same vertical square shaft. Thus, any movement of master carriage M is transmitted to secondary carriages BL and C in addition to carriage BR. The controls and operation of carriages BL and C are similar.

Figure 11:
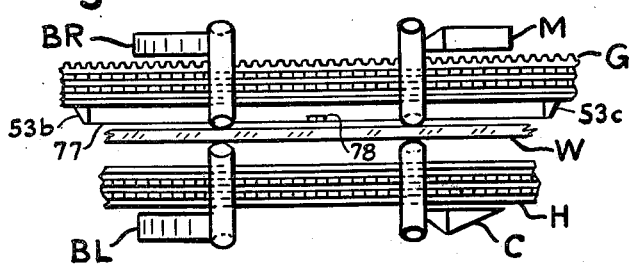
Fig. 11 is a fragmentary sectional view through board W taken along line 11—11 of Fig. 10.
Figure 12:
Fig. 12 is a fragmentary sectional view taken along line 12—12 of Fig. 10.
Figure 13:
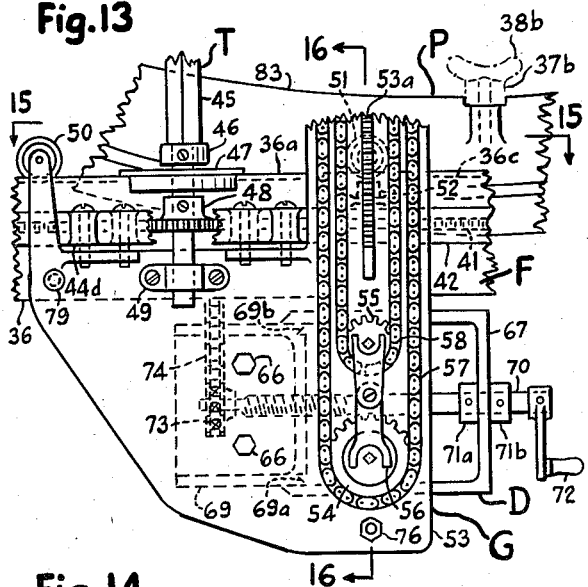
Fig. 13 is an enlarged fragmentary plan view taken at the beam end along line 13—13 of Fig. 14.

Fig. 11 shows the stylus of carriage M lining up with that of carriage C and the stylii of carriages BR and BL lining up. They can be operated, however, without any two lining up. The stylii on carriages BL and C draw on a second drawing which is fastened to the far or under side of board W. There are many other workable surfaces besides drawings which can best be done by using carriages BL and C. They shall be described in detail further on.

The supporting frame F has a rectangular framework 36 with an octagonal opening in it. Framework 36 is supported by four supporting parts or supports 37 which may be adjustable for length and which are used as legs, hangers or brackets, depending on the position of the machine, that is, depending upon whether the machine is set horizontally, vertically or in a tilted position. Parts 37 are fastened to framework 36 with wing head bolts 38 which are threaded into tapped holes in lugs 36b on framework 36. When the parts or supports 37 are not being used, they may be folded as shown by the dot-dash outline 37a.

When subcombinations are used, omitting beam H, diaphragms D, carriages C and BL, parts 37 may remain as before or they may be removed and relocated by fastening to the inside of protractor P with nuts 38. The new position of each part 37 is marked 37b and the new position of each nut 38 is marked 38b. Positions 37b and 38b are shown in dot-dash outline. When parts 37 are fastened in position 37b, the frame F can be rotated around protractor P. With this subcombination and a translucent board W, projected graphic views can be projected onto the far side of board W to be traced, viewed or used in marking other graphic views. The drawing remains stationary as compared to moving the drawing in the previous set-up.

Other subcombinations that do not always use supports 37 omit beam H, diaphragms D, carriages C and BL and board W, then protractor P rests against a table on which a drawing is fastened or the protractor rests against a workable surface of a material that is to be graphically laid out, such as a metal plate.

Other subcombinations that do not always use supports 37 omit protractor P, in addition to beam H, diaphragms D, carriages C and BL and board W, then frame F rests against a table on which a drawing is fastened or frame F rests against a workable surface of a material that is to be graphically laid out, such as a metal plate.

Figure 16:
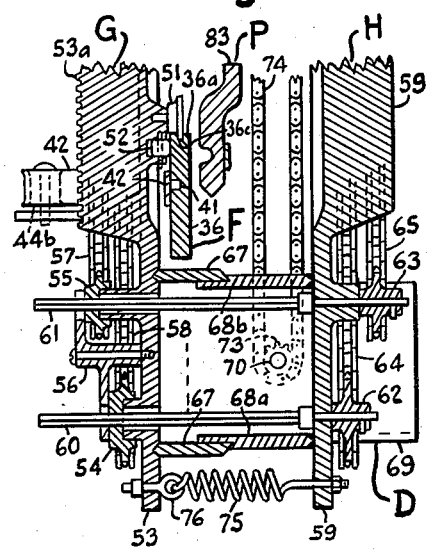
Fig. 16 is an enlarged fragmentary sectional elevation through the beam and is taken along line 16—16 of Fig. 13.
Figure 15:
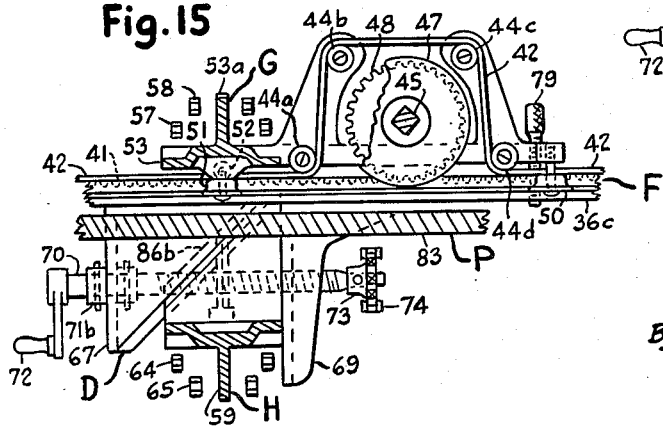
Fig. 15 is an enlarged fragmentary sectional elevation taken at the end of the beam along line 15—15 of Fig. 13.
Figure 52:
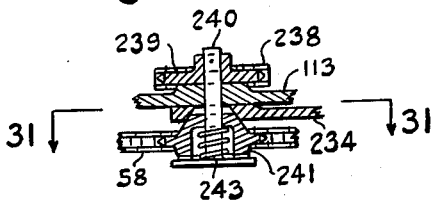
Fig. 52 is a cross-sectional view taken along line 52—52 of Fig. 28.

Frame F has four grooved wheels 39 pivotally mounted thereon which revolve on shafts 40. Wheels 39 engage the outside or perimetrical edge of protractor P and support the protractor. Wheels 39 act as bearings for protractor P when it is rotated. Rectangular frame 36 is thicker along the ends where the track edge 36a is located. A groove in the track has a rack 41 fastened therein. Track edge 36a has a groove 36c as shown in Fig. 15 and Fig. 16.

A flexible guard 42 covers the full length of rack 41, except near that part of the rack 41 which is being engaged by the spur gear on shaft T. Guard 42 passes over the spur gear on shaft T. It is guided by pulleys 44a, 44b, 44c and 44d as shown in Figs. 13, 14, 15 and 16. The pulleys are supported on beam G. Guard 42 is fastened to frame F with screws 43.

Guard 42 prevents dirt, tools or other materials from fouling the rack teeth 41. It also prevents oil and dirt from rack teeth 41 soiling the clothes or hands of the operator, and prevents the operator from scratching his hands on the sharp rack teeth.

The shaft assembly T consists of a square shaft 45 with rounded ends. The shaft could be other than square if means were made to grip it when it is to be restrained. If other than a square shaft is used, the related parts must be made to suit the shape. The turned ends of shaft 45 are fitted with collars 46 which are fastened to shaft 45 with a set screw. Flanged wheels 47 are slid onto shaft 45. Wheel 47, however, is not keyed to shaft 45, but is free to turn.

Spur gears 48 are fastened or keyed to shaft 45 with set screws. The ends of shaft 45 revolve in bearings 49. The bearings are connected to beam G with bolts. Wheels 47 ride on the track on frame 36. Also the flanges of both wheels 50 and 51, which wheels are mounted on body 53 (see Figs. 13, 15 and 16) ride in grooves 36c and restrains beam G from leaving its position in relation to the track. Beam G has a plain wheel 52 which rides on the same track surface as flanged wheel 47 (see Figs. 13, 15 and 16).

The main body 53 of beam G is shaped similar to an inverted letter T, and it has an irregular flat offset on each end for supporting or connecting to the adjoining parts. The stem of body 53 has rack teeth 53a. Body 53 supports sprockets 54 and 55 near their ends. These sprockets revolve on bosses or offsets of body 53 and a stay 56 keeps them in position. A continuous chain 57 engages sprockets 54, and transmits the movement of master carriage M to carriage BR and with other parts, as will be explained in detail hereinafter. The motion is carried also to carriages C and BL. A continuous chain 58 engages sprockets 55. Chain 58 transmits the pivot movement of the pivot arm on carriage M which controls the width of lines made by all the styli on other carriages. Slackness in chains can be taken up by removing links of the chain or by attaching conventional chain take-ups. On a fine delicate graphic machine where weight and cost must be kept down, a perforated band of plastic or other suitable material, for instance, very similar to small motion picture film can be used instead of a conventional chain.

The body of beam H is 59 which is shaped similar to body 53, except for the ends and the omitting of the rack teeth. Body 59 supports shafts 60 and 61. Shaft 60 has a sprocket 62 keyed to it with a set screw. Shaft 61 has a sprocket 63 keyed to it with a set screw. A continuous chain 64 engages sprockets 62. Chain 64 transmits movement to carriages C and BL which originates from carriage M. A continuous chain 65 engages sprockets 63. Chain 65 transmits the pivot movement to carriages C and BL which originates from carriage M.

Sprockets 54 and 55 have square holes to make sliding fits with squared parts of shafts 60 and 61. Thus, shafts and sprockets remain engaged when beams G and H are varied by diaphragms D. This arrangement allows the shafts to be removed without disturbing sprockets 64 and 65 when beam H and diaphragms D are not required for some subcombinations. Carriages C and BL operate on beam H in the same manner carriage BR operates on beam G.

Diaphragms D which connect beams G and H are supported by beam G and are fastened thereto by cap screws or bolts 66. Diaphragms D are adjustable wedge devices which operate to adjust beam H to compensate for variations in thickness of the board or working surface W. Since board W may consist of various combinations of different thicknesses, such as a board with a thin paper drawing adjacent to beam H, a heavy cardboard may be used for a drawing or template, instead of a thin paper. A second piece of glass or other transparent substance may replace the drawing paper. Since glass has such a low coefficient of expansion, good for very accurate work, the drawing paper adjacent to beam G may be omitted and the surfaces of two pieces of glass used as the workable surfaces. Then the two sheets of glass may be removed and placed together so as to have the lined surfaces adjoining so they can be photographed accurately (two color drawings, etc.). Board W may be a thick piece of material to be fabricated, that is, to be laid out on both sides simultaneously (glass board being removed). Board W may be two thick pieces of material to be fabricated and to be placed together to form such board so that the outer, opposite surfaces of each are laid out simultaneously, thereby marking pieces in an opposite manner, thus making right and left-hand pieces—or by selective carriage arrangements, identical pieces may be made.

Diaphragm D consists of a U-shaped piece 67 which has its parallel sides tapered to form wedge-like shapes. The edges of piece 67 which bear against body 53 are tapered to a V to engage and slide in a V groove in body 53. The diagonal bearing edges of U-shaped piece 67 are tapered about 45° to engage and slide in the grooves in triangular pieces 68a and 68b. Pieces 68a and 68b are welded or fastened to body 59.

Support piece 69 is fastened to body 53 with cap screws 66. Support piece 69 has grooves 69a and 69b which engage the beveled edges of pieces 68a and 68b. Pieces 68a and 68b bear and slide in these grooves.

A shaft 70 is supported by a plain hole in piece 67 and the tapped hole in body 69. Collars 71a and 71b are connected to shaft 70 by pins. A handle 72 is connected to shaft 70 by a pin. A sprocket 73 is fastened to the end of shaft 70 with a pin. A continuous chain 74 engages sprocket 73. The rotation of one sprocket 73 is transmitted to the sprocket on the other diaphragm D by chain 74.

A tension spring 75 is fastened to body 59 and hooked onto eyebolt 76 which is fastened to body 53.

Diaphragms D are controlled to suit the thickness of board W by turning handle 72 of either diaphragm D. Shaft 70 being revolved by handle 72 moves back or forth due to the screw action of the threaded part of shaft 70 in the tapped hole in piece 69, thus shortening or lengthening the distance between the back of piece 67 and the back of body 69. This lateral movement moves piece 67 which forces pieces 68a and 68b to slide down against the force of spring 75 or allows it to slide up, pulled by the action of spring 75. Alignment of beams G to H is maintained without slack or play.

*Wire and center indicator for orienting stylus with working point*

In Figs. 10 and 11, two small arms 53b and 53c are shown protruding from the underside of body 53 of beam G. Arms 53b and 53c are supported from the underside of body 53 and are curved to clear carriages M and BR. Arms 53b and 53c have the ends of a wire 77 attached to them. Wire 77 acts as a guide in lining up two points which are to be connected with a drawn line. Wire 77 is a little to the left of the styli on carriages M and BR so as to clear them. A small pointed lug or marker 78 is fastened on wire 77 in the exact center of the wire. Arms 53b and 53c are adjustable and resilient so they can be adjusted to pull lug 78 into perfect centering position and so they will give when wire 77 or lug 78 is pulled aside by contact with other parts of the machine.

*Use as a beam compass*

The beams G and H may be used to draw circles and arcs. Beam G is locked to frame F in this operation as will be described below. Marker 78 indicates the center of protractor P when beam G is locked to frame 36 with removable pins 79 so styli are in alignment with the center of protractor P (see left-hand end of Fig. 14).

The paper drawing or workable surface is moved so the center or radial point is directly below the point of marker 78. Marker 78 lines up with the center of the styli. The paper is fastened to board W and the radius of the arc or circle to be drawn is measured with carriage M from marker 78. Carriage M is then locked to rack 53a on body 53 with a screw arrangement shown in Fig. 30 by which screw 80 is turned by knurled knob 81 which is fastened to screw 80 by a set screw so that the resilient shoe 82 on screw 80 is forced against rack 53a, thus restraining carriage M from moving along body 53. Carriages BR, C and BL can all be set to draw different radii. Protractor P is unlocked at L so that it can be pushed and rotated into a complete circle with the styli marking the drawings and forming the circles. This feature of the machine in general is of limited value as the drawing must be moved to line up different radial points to marker 78.

On the other hand, when a subcombination is being used with board W omitted or board W, diaphragms D and beam H omitted so the machine can be centered on the drawing or workable surface at any radial point, it would be much more practical than a conventional beam compass on large and medium circular work as in wind tunnel construction drafting where the drawing largely involves circular lines. The weak feature of the conventional beam compass is the frequent necessity of sharpening the lead or stylus, the danger of cutting through or snagging the drawing if the lead or stylus is sharp and the inability to speedily draw dotted lines.

*Protractor ring "P"*

The protractor ring assembly P has a ring 83 supported by wheels 39. Fig. 18 is an enlarged fragmentary plan view of groups involving control K and locking mechanism L along with fragments of frame F and protractor P. Fig. 19 shows a typical section through ring 83. 83a is a rib of ring 83 which is tapped for location 38b. The outside diameter of ring 83 is tapered to fit the groove in wheels 39 and brake block 84. Ring 83 has protractor markings—two quadrants have degree markings 83b and the other two quadrants have inch markings 83c. Inch markings 83c correspond to the small angle of a right angle triangle which has a base of 12 inches and the short side variable. The length in inches of this variable side is used to indicate the small angle of the triangle thus made. This type of angular measurement is referred to as the bevel which is the rise in inches per 12 inches of run. This system is used most extensively in structural steel work—the degree system is used on circular work and very exacting structural steel work. Indicator arrows 85a, 85b and 85c on frame 36 are opposite the horizontal and vertical center lines of protractor P. Indicator arm 36d at L (see Fig. 18) is the fourth indicator on the center lines. A continuous circular groove 83d in the face of ring 83 has threads 83f in the groove surface. Threaded stops N are inserted in groove 83d, and these stops N engage threads 83f. Two recesses 83g run through threaded area 83f (see Figs. 21 and 22 for detail of a stop N). A stop N consists of a threaded stud 86, a resilient disk 86a and a machine screw 86b. A lock washer could be inserted between stud 86 and disk 86b. Stud 86 may be made of metal such as magnetic metal ("Alnico") having an aluminum-nickel-cobalt composition. It is threaded so as to maintain a loose enough fit to enter groove 83d. Since stud 86 is a helix, it would not enter groove 83d if the thread fit were too close in size. The two recesses 83g allow helical stud 86 to drop into groove 83d so as to maintain the minimum play between the groove and stud 86. (An example of a threaded groove being engaged to a threaded rod is the half nuts on a lathe feed.) Stud 86 has a hexagonal shoulder at one end which engages a hexagonal hole in disk 86a. This hexagonal shape prevents stud 86 from turning in disk 86a. Disk 86a is made of a resilient substance, such as rubber, and is slightly larger in diameter than is stud 86. Stud 86 has a hole through the center which is tapped to suit machine screw 86b. An end of stud 86 and the head of screw 86b are counterbored to fit pins 87a on stop tool 87.

Stop tool 87 is used to grip a stop N in placing or removing it from groove 83d. Tool 87 is made of a resilient material such as spring steel. Since the distance between pins 87a is greater than the length of stop N, the prongs of tool 87 are squeezed to grip N. The chisel point 87b on tool 87 is used to engage teeth-like grooves on the thread of stud 86. These teeth-like grooves 86c on stud 86 are one complete turn of thread in the center of stud 86, thus leaving ungrooved threads at each end of stud 86. If stud 86 were grooved full length, there would be a tendency to cut into groove 83d. Tool 87 is connected to frame 36 with a chain 94.

Stops N (and any number may be used) are inserted in groove 83d and turned in groove 83d by action of point 87b on teeth-like grooves 86c in stud 86 to obtain micrometer accuracy to any given angle marking 83b or 83c. In general, these stops N would be used only for angles that are used frequently, such as 0°, 30°, 45°, 60° and 90°, but any other angle or bevel which is used frequently could have a stop N inserted. These stops may remain in the groove without interfering with any operation. The resilient disk 86a on stop N is squeezed into the groove 83d, thus securely holding stop N within groove 83d. It also prevents stop N from creeping, jarring loose or falling out. Studs 86 may be made of magnetizable metal such as an aluminum-nickel-cobalt alloy known as "Alnico." With magnetized studs 86, an iron band 88 may be fastened to ring 83 to complete the magnetic path to stud 86. If ring 83 were made of iron or steel, the band 88 may be omitted. If ring 83 were made of plastic, band 88 may be inserted within the plastic, although if ring 83 were made from plastic, it would be practical to place a steel or metal insert in the plastic to form groove 83d with teeth 83f. In operation, stops N would bear against prongs or fingers on the locking arm. The protractor lock or brake assembly L is shown in Figs. 18, 19, 20a and 20b.

Lever 89, Fig. 19, is supported by ribs 36e on frame 36 with pin 90. The handle of lever 89 is pushed or pulled down by the action of a foot pedal attached to chain 91 releasing brake block 84 and raising prongs 92a and 92b which releases bumpers 93a and 93b from contact with stop N and raises bumpers 93a and 93b above stop N so that ring 83 is free to rotate to any desired position. Prongs 92a and 92b are fastened to lever 89 with machine screws. Bumper 93a is fastened to prong 92a and bumper 93b is fastened to prong 92b with machine screws. A spring 95 exerts a pressure on brake 84, tending to lock it against ring 83. A pin 96 with a conical end to engage a conical large hole 84a in brake 84 is moved down by the action of lever 89, compressing spring 97 and forcing block 84 radially outwardly by the action of the point of pin 96 against the side of hole 84a. Spring 97 under the head of pin 96 forces the pin upwardly which also forces lever 89 upwardly when pressure is removed from lever 89. Spring 97 is necessary since it returns lever 89 when spring 95 is removed since it would be desirable at times to disconnect spring 95 so brake 84 does not operate and so that stop N only may be used with lever 89 to lock protractor ring assembly P.

Guide pins 98a and 98b restrain brake 84 from moving sideways. Brake 84 alone may be used to lock assembly P without using any stops N. Stops N have two functions when already set in groove 83d, they may act only in indexing the proper angle 83b and 83c to indicator 36d, the brake 84 holding ring 83 when the proper position is reached, or they may act as both index and lock or stop.

Fig. 20a shows a stop N locked into position. Fig. 20b shows a stop N in groove 83d as protractor ring assembly P is being rotated in the direction of arrow 99. Since brake 84 and spring 95 are operating, lever 89 is lowered only slightly so as to disengage brake 84 from ring 83. Lowering lever 89 raises bumpers 93a and 93b equally to the same distance from the bottom of the groove as 93a is located. When the protractor ring is rotated, stop N hits the sloping surface of bumper 93b, forcing bumper 93b up since prong 92b is resilient and allowing stop N to pass under bumper 93b until it comes to bumper 93a where it is obstructed and is forced to stop. After stop N has passed bumper 93b, the bumper returns to its former position, which is similar to the position of bumper 93a, thus blocking or stopping stop N and assembly P from moving in either direction. When spring 95 is removed, and brake 84 is not operating, lever 89 does not require depressing, since stop N can raise bumpers 93a or 93b and lock into position.

Electrical controls "K"

Electrical controls group K are located near the protractor locking mechanism L so they both can be operated with the least amount of motion by the left hand of the operator. A mast 100 which supports electric cable 101 for carriages M and BR is supported by frame 36 and is fastened with set screw 102. Mast 100 is a tube and a second mast 103 telescopically fits into a hole in mast 100 and is fastened with a set screw 104. Mast 103 supports electric cable 105 for carriages C and BL. Electric control board 106 is connected to frame 36 with machine screws. Cable 107 is connected to a power source. Control board 106 has switches, rheostat and plugs for controlling carriages M, C, BR and BL. Fig. 100 shows the eelctrical diagram which shall be explained later.

Group W consists of a board 108 which is fastened to ring 83 with four bolts 109. For drafting, board 108 could be made of glass; for use as a template board, it could be a hard finished board that is not transparent. A glass or plastic board which is transparent or translucent allows illumination from behind the board, as explained hereinbefore. The drawing paper 110 is fastened to board 108 with drafting tape 111. A sketch 112 is an example of the work that can be made with this machine.

Inasmuch as the operator may prefer to use a conventional compass which has a sharp point which penetrates the drawing board, a piece of $1/16''$ thick clear plastic material (not shown) such as "Lucite," can be fastened to board 108 under the drawing. The "Lucite" can be pierced by a compass point and it is hard enough to still allow the stylus or style to register properly. The "Lucite" permits the use of glass for board 108. Glass is an ideal material for the purpose since it is transparent, hard, smooth, flat, durable and strong. It does not absorb moisture, it is noncorrosive, easily cleaned and has low expansion coefficient. When long drawings 110 are too long for board 108, they may have their ends dropped through the segmental spaces between board 108 and ring 83.

Master carriage "M"

The master carriage M is shown by Fig. 24 to Fig. 64. Fig. 24 shows the elevation of carriage M. Figs. 25, 28, 33 and 37 show more clearly the construction of carriage M than does Fig. 24.

The main framework part 113 is supported by three flanged wheels 114a, 114b and 114c which ride on the edges of beam 53. The top frame part 115 (see Fig. 25) is fastened to other frame parts with machine screws. Frame post 116 is fastened to other frame parts with machine screws. The pivot arm 117 is fastened to the carriage framework which supports it with shaft 118 and pin 119. Pivot arm 117 may be pivoted over an angle of 270° for selective indexing or locking, combined with the correct pivot angle for varying the width of lines to be drawn.

Stylus or style 14c is identical to 14 of Fig. 1 insofar as the principles of operation of a rotary stylus or style are concerned.

Referring to Fig. 37, which more clearly illustrates the mechanism associated with the stylus, style or stylus holders, group E, consists of part 120 which holds and grips most of the stylus. The tapered end of stylus holder 120 is split and the prongs are bent in, so as to grip stylus 14c, thus restraining the stylus from turning within part 120. A set screw 24c on holder 120 is for holding liquid stylus 25c. Set screw 24c is used for the same purpose as set screw 24 of Fig. 2. A gasket 23c is identical to gasket 23. A bevel gear 121 is splined to holder 120. A ball bearing 122 is soldered or fastened to gear 121. Bearing 122 is press (tight) fitted to arm 117, and has a loose fit with holder 120. Stylus holder part 123 is press fitted to holder 120. Stylus holder part 123 has a sliding fit to shaft 123. Ram 125 engages threads in the upper part of stylus holder part 123. Gasket 125a is molded or stretched on arm 125 and is used in conjunction with a liquid stylus.

Figure 58:
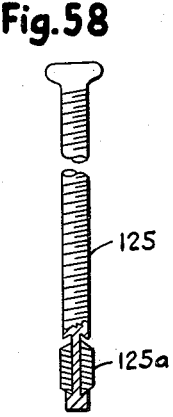
Fig. 58 is an enlarged plan view partly in cross-section of the stylus ram shown in Fig. 37.

Fig. 58 is a detail of ram 125 and gasket 125a. Stylus holder cap 126 has a bayonet fitting to engage arm 117. Machine stud and nut 127 ties shaft 124 to cap 126. Cap 126 acts as a bearing for shaft 124. Shaft 124 revolves when bevel gear 128 on shaft 118 is revolving as gear 128 meshes with gear 121 which is splined to holder 120. Thus stylus 14c revolves. Ram 125 feeds out the stylus 14c as it wears away. This feeding action for the stylus 14c is controlled either manually or automatically by turning holder 120 and holding shaft 124. The abutting surface of holder 123 and shaft 124 are tight enough to act as a slip clutch. When assembly 120—123 is turned, shaft 124 can be restrained by a force large enough to overcome the friction between part 123 and shaft 124. Holder 120 may be restrained and shaft 124 revolved to feed stylus 14c. When either holder 120 or shaft 124 is being revolved, and the other held stationary, the thread on part 123 being engaged with the thread on ram 125 causes the ram to move up or down in shaft 124. When it moves down, it pushes stylus 14c, thus feeding it through holder 120.

Figure 59:
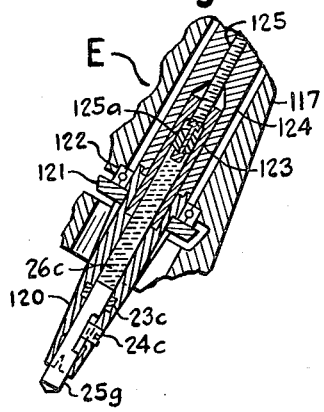
Fig. 59 is a fragmentary cross-sectional view of the liquid stylus assembly.

Fig. 59 shows a fragmentary view of stylus holder E when it is being used with liquid stylus 25g which is identical with stylus 25. Liquid 26c is identical with 26 of Fig. 7. Cap 126 is turned and holder E is lifted for changing stylus 14c, etc.

*Automatic stylus feeder for carriage "M"*

Figure 60:
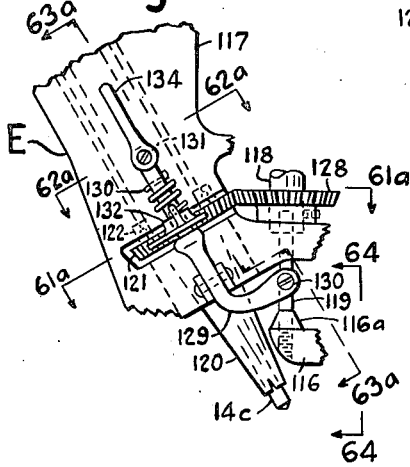
Figure 64:
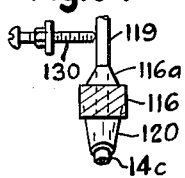
Fig. 64 is a fragmentary cross-sectional view taken along line 64—64 of Fig. 60.
Figure 95:
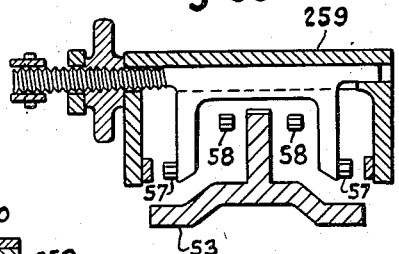
Fig. 95 is a cross-sectional view taken along line 95—95 of Fig. 88.
Figure 96:
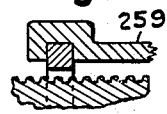
Fig. 96 is a fragmentary cross-sectional view taken along line 96—96 of Fig. 88.
Figure 93A:
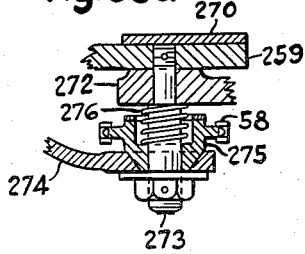
Figs. 93a and 93b are cross-sectional views taken along line 93a—93a of Fig. 88 but showing the parts in different positions.
Figure 97A:
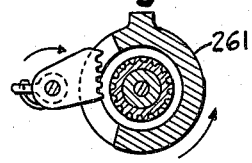
Figs. 97a and 97b are cross-sectional views taken through line 97a—97a of Fig. 94 and showing the geared parts in engagement and out of engagement, respectively.
Figure 97B:
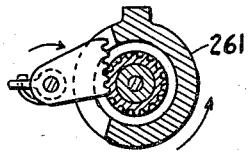
Figure 98A:
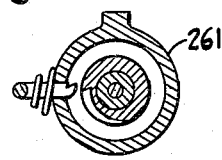
Figs. 98a and 98b are enlarged cross-sectional views taken through line 98a—98a of Fig. 94 and showing the pawl out of and in engagement, respectively.
Figure 98B:
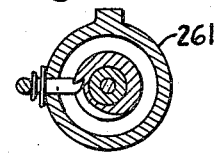
Figure 93B:
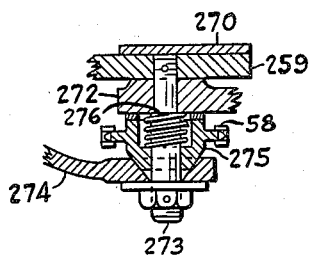
Figure 99A:
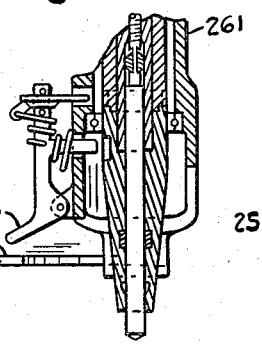
Figs. 99a and 99b are fragmentary longitudinal cross-sectional views taken through the stylus feeding mechanism taken through line 99a—99a of Fig. 94.
Figure 99B:
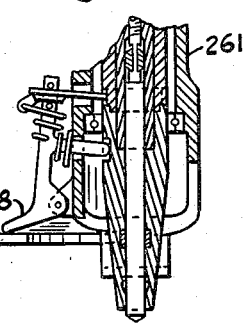
Figure 94:
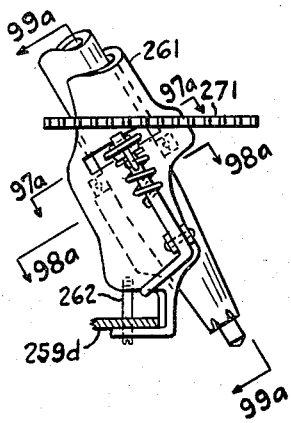
Fig. 94 is a fragmentary elevational view taken along line 94—94 of Fig. 88.

Figs. 60, 61a, 61b, 62a, 62b, 63a, 63b and 64 show the operation of the automatic feeding arrangement for stylus 14c. Fig. 60 is a fragmentary elevational view of stylus 14c and adjoining parts. Figs. 61a, 62a, 63a and 64 show mechanisms when stylus 14c is sufficiently projected from holder 120 so that the feeding mechanisms are not operating.

Figure 61A:
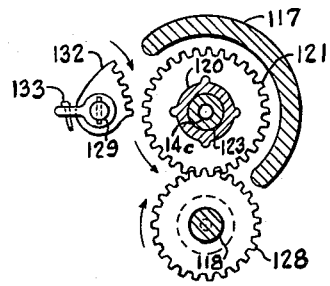
Fig. 61a is a cross-sectional view taken along line 61a—61a of Fig. 60 showing the gears out of engagement.
Figure 61B:
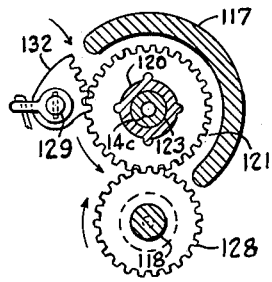
Fig. 61b is a cross-sectional view which is the same as Fig. 61a except that the gear parts are shown in engagement.
Figure 62A:
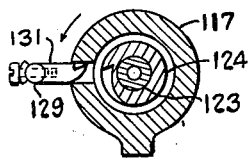
Fig. 62a is a cross-sectional view taken along line 62a—62a of Fig. 60.
Figure 62B:
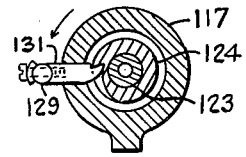
Fig. 62b is a cross-sectional view the same as Fig. 62a except showing the parts in engagement.
Figure 63A:
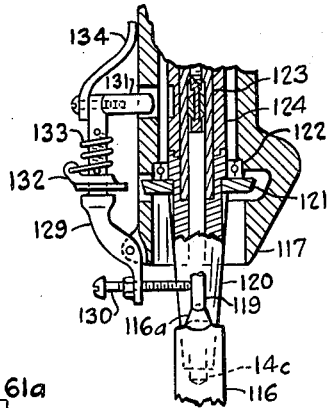
Fig. 63a is a fragmentary cross-sectional view taken along line 63a—63a of Fig. 60 showing pawl 131 out of engagement.
Figure 63B:
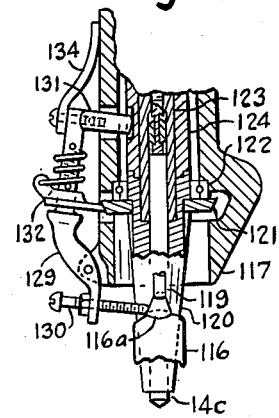
Fig. 63b is a cross-sectional view which is the same as Fig. 63a except showing the pawl in engagement.

Figs. 61b, 62b and 63b show the feeding mechanism in operation to advance the stylus 14c. The automatic feeding mechanism cuts in and off to maintain sufficient projection of stylus 14c without the help of the operator. The lever 129 is pin connected to arm 117. Adjusting screw 130 engages threads in lever 129. A lock nut on screw 130 restrains the lever from turning after it is set. Screw 130 contacts or engages pin 119 until stylus 14c wears away, then when pivot arm 117 is lowered, lever 130 engages conical boss 116a on frame post 116. A pawl 131 is fastened to lever 129 with a machine screw. A cam-like part gear 132 is mounted on lever 129. A shoulder on lever 129 and a pin prevent it from sliding out of place. A helical spring 133 is mounted on lever 129, one end of the spring being fastened to lever 129 and the other end being fastened to gear 132. When gear 132 rotates on lever 129, spring 133 returns it to the original position. A spring 134 tends to keep the pawl end of lever 129 away from arm 117. It exerts a force which keeps screw 130 in contact with pin 119 or 116a, except when pawl 131 is engaged with shaft 124.

In operation, stylus 14c wears down until it needs to be fed or projected a little from holder 120. When arm 117 is lowered, screw 130 rides cone 116a to give a cam action to the arm. Thus lever 129 tilts, moving pawl 131 in until it engages the catch in shaft 124. Since shaft 124 rotates in a counterclockwise direction, the catch therein tends to catch pawl 131, even if only slightly projected into the cut in shaft 124. Once shaft 124 and pawl 131 are engaged, they have a tendency to tighten and pull pawl 131 further into the cut or catch in shaft 124. When pawl 131 is pulled in, cam gear 132 is tilted or pulled into contact with gear 121 and the two become engaged. The rotary movement of bevel gear 121 rotates cam gear 132, since only a fraction of a turn is enough to advance stylus 14c. The short distance bevel gear 121 revolves while cam gear 132 is in contact with it is the amount of turn necessary to advance stylus 14c. Cam gear 132 acts as a cam in that as it rotates, it pushes lever 129 away from arm 117 and in doing so it pulls pawl 131 from the catch or cut in shaft 124. The leaf spring 134 now holds lever 129 out along with pawl 131 and screw 130 now contacts pin 119. Lever 129 is resilient from its support on pivot arm 117 to screw 130, thus allowing lever 129 to give when pawl 131 contacts shaft 124 opposite the catch.

It will be noted that this mechanism operates or advances stylus 14c only when this stylus is revolving counterclockwise, which is sufficient for a stylus that does not wear down too fast, since the direction of travel or movement of stylus 14c is being alternated frequently. On the other hand, when all lines are being drawn in the same direction, or when a soft, fast wearing stylus is being used, the carriage must be pushed or pulled so as to have the stylus rotating counterclockwise. When stylus 14c wears down and as it rotates clockwise, pawl 131 touches shaft 124, but it cannot catch and merely bumps into the cut in shaft 124 and out again. The resilient end of lever 129 takes up the strain and thus prevents binding or breaking of the parts.

The automatic feed acts in a similar way for liquid stylus 25g shown in Fig. 59. When stylus 25g slides into holder 120 slightly as the liquid is used up, the feeding mechanism goes into play and turns and advances ram 125 creating a hydraulic pressure in the liquid which forces stylus 25g towards it maximum projected position, then shutting off until the stylus must again be projected.

*Pivot control arm "Y"*

As will be seen in Figs. 24 and 37, the pivot control Y may be used where shown by full lines and marked Y, or it may be removed and fastened to the upper part of the pivot arm 117 as indicated by dot-dash lines and marked Ya.

Pivot control Y is used to facilitate the pivoting of pivot arm 117. The handle 135 is held by the operator in the same way as a pencil or pen is held. Handle 135 may be made of a resilient, anti-skid substance such as rubber. The surface of handle 135 should be knurled or roughened to allow for easy gripping. Handle 135 may be in the form of a hollow cylinder.

Handle core 136 fits tightly into the lower part of handle 135 so as to rotate with it when the handle is turned. Shaft 137 is fitted in a hole in core 136 and is fastened to the core by a set screw. Gear support 138 has holes for supporting shaft 137 and machine screw 139. Bevel gear 141 is pressed fitted to screw 139, and it will not turn since screw 139 is threaded into the tapped hole in pivot arm 117 and a pin is run through pivot arm 117 and screw 139 to prevent the screw from turning. Washers on both sides of gears 140 and 141 reduce friction as does the washer between pivot arm 117 and gear support 138 on screw 139.

Pivot control Y operates as follows:

Handle 135 is held by the operator and the pivot arm 117 is lifted or lowered by raising or lowering the handle. When the proper pivot angle has been determined by the operator, he rolls handle 135 between the thumb and fingers, thus revolving gear 140. Since handle 135 remains almost stationary while being rotated, when gear 140 turns gear 141, it also turns or pivots arm 117 which is pin connected to screw 139 on which gear 141 is fixed securely. The minimum amount of hand movement by the operator is to be had by using pivot control Y. The pivot arm 117 may be turned, instead of control Y, to the selected pivot angle, but as the pivot angle on carriage M is 270°, there would be considerably more hand movement, and much of this movement would be in unnatural hand positions which would be slow and cumbersome. Since handle 135 is resilient, it aids in making intermittent lines and locking the movement of carriage M or beam G as it has some spring or give which absorbs some of the shock of stopping, starting, locking, directional change or reciprocation, such as encountered for making a dotted line. Alternate position Ya of control Y is used when the operator's hand is rested on top of carriage M which is the most favorable position when making ink lines, liquid lines, or working on a rough paper or rough workable surface. Thus, the operator is less likely to smear freshly inked lines, liquid lines, pencil lines or injure his hand, arm or elbow as is the case when the hand rubs the paper or workable surface. With conventional equipment, draftsmen often get sore hands, similar to bunions, from continuous rubbing against the drawing paper.

In humid weather, a draftsman has a difficult time preventing perspiration from his hand from soiling the paper. Also, the weight of his hand on the paper smears pencil lines. A detail of the pivot arm shaft 118 is shown in Fig. 37. Shaft 118 fits into a counterbored hole or socket in pivot arm 117 at the bottom and a socket on the top in takeup screw 142. These two socket holes act as bearings for shaft 118. Shaft 118 has a hole in the bottom to clear pin 119 when pivot arm 117 is lowered. Bevel gear 128 is keyed to shaft 118 with a set screw. Dotting cam J is fastened to shaft 118 with a set screw (see Fig. 46 for cam). A sprocket 143 has a square hole through the center which slides on the square part of shaft 118 so that sprocket 143 turns shaft 118. Collar 144 is pressed fitted to the small round end of shaft 118. Spring 145 bears against sprocket 143 and collar 144, spring 145 tends to lift collar 144 and thus the entire pivot arm when not restrained otherwise. Carriage frame part 146 is fastened to frame post 116 with a machine screw. A hole in frame post 116 and hole in frame part 146 act as bearings for sprocket 143. Also, frame post 116 and frame part 146 hold sprocket 143 from moving, except revolving. Jack R is supported by frame part 146, which jack will be described later.

Fig. 33 shows a plan view of chain drive for sprocket 143. Chain 147 engages sprockets 143 and 148. Sprocket 148 is fastened to drive shaft 149.

Fig. 39 shows drive shaft 149 and its relation to other parts.

Reversible motor 150 has a beveled gear 151 which engages beveled gear 152 on shaft 149, thus motor 150 drives shaft 149. Shaft 149 can be driven by movement of shaft 45 or movement of carriage M along body 53 so as to engage rack 53a thereon.

Shaft 149 is revolved along with shafts 153 and 154 (see Fig. 28). Shaft 153 has a beveled gear 155 attached to the end which engages bevel gear 156 which is keyed to shaft 149. Clutch part 159a has a collar 160a. A set screw holds shaft 153, clutch part 159a and collar 160a together securely. Clutch part 159b, collar 160b and shaft 154 are similar in construction. Clutch gear part 161 revolves on shaft 153. It is shown in neutral position. Gear teeth 161a engage gear 162 on square shaft 45. Gear 162 has a square hole through its center to engage shaft 45. Gear 162 has rounded ends to engage frame 113. Curved, as distinguished from dished, spring steel washers 163a and 163b tend to keep gear part 161 in neutral when it is not forced along shaft 153 by the action of shifting arm 164a. Flat bronze washers may be placed next to steel washers 163a—163b to act as thrust bearings. When the action or movement of arm 164a (the source of which movement will be explained later) forces gear part 161 against clutch part 159a, the engaging surfaces act as cone clutch surfaces, thus clutch part 159a and gear part 161 revolve together when in contact. When the action or movement of arm 164a forces gear part 161 in the opposite direction so that gear part 161 bears against framework 113, the engaging surfaces act as brake surfaces, thus preventing gear part 161 from revolving.

Clutch gear part 165 is similar to gear part 161 and washers 163c—163d are identical to washer 163a. Gear part 165 works in a similar manner as gear part 161. Gear teeth 165a engage rack 53a. Shifting arm 164b pushes clutch gear part 165 along shaft 154. When gear part 161 is engaged to clutch part 159a, gear part 165 is locked to framework 113 and when gear part 165 engages clutch part 159b, gear part 161 is locked to framework 113, or both are in neutral position, as shown.

Shaft 166 (see Fig. 37) is supported by framework 113 and frame part 115. It has part 164 fastened to it with a set screw near the lower end. A clevis-like piece 167 is fastened with a set screw to the upper end of shaft 166 (see Fig. 24 and Fig. 25).

As will appear in Fig. 25, when pivot arm 117 is pivoted to a desired angle and lowered, the carriage M is locked so as to allow it to move only in the direction selected. At the same time, the pivot arm 117 is at the proper pivot angle to produce the desired width of line to be drawn. When arm 117 is held down within pivot angle 168a, 168b or 168c, carriage M is locked so that it cannot move along body 53, but body 53 is free to move perpendicular to its length and it carries carriage M with it.

When pivot arm 117 is held down within pivot angle 169a, 169b or 169c, carriage M is locked to shaft 45, and prevents it from revolving. Carriage M is free to move along body 53. Body 53 is locked as it is fastened to shaft 45 at the ends. When pivot arm 117 is held at line 170a, 170b, 171a or 171b, a thin line is drawn. When pivot arm 117 is held at an angle to line 170a, 170b, 171a or 171b, a maximum of which is slightly less than 45 degrees or the entire pivot angle 168a, 168b, 168c, 169a, 169b or 169c, the width of line to be drawn is increased. The larger the angle, the greater the width of line. When carriage M is not locked but is used free hand or with a curved guide, this pivot angle arrangement does not govern since pivot arm 117 may then be pivoted to 90 degrees, thus allowing a greater width line to be drawn. If desirable, cam 172 could be changed so as to govern locking when a 90 degree pivot is required for very wide lines. Cam 172 (see Fig. 25 and Fig. 37) revolves on shaft 173. Shaft 173 is supported by frame part 115, but does not revolve. A sprocket 174 is fastened to cam 172 with a set screw. A sprocket 175 is rigidly fastened to arm 117 with a set screw. A chain 176 engages sprockets 174 and 175. When pivot arm 117 is pivoted the maximum 270 degrees, chain 176 turns cam 172 360 degrees. Slots in cam 172 correspond to pivot angles of pivot arm 117. Slot 172a (see Fig. 25) corresponds to the pivot angle of 169a and 169b combined. Slot 172b corresponds to the pivot angle of 168a and 168b combined. Slot 172c corresponds to the pivot angle 168c. Slot 172d corresponds to the pivot angle 169c. Markings 172e on cam 172 correspond to 15 degree intervals in pivot angle (see Fig. 25 and Fig. 37). When pivot arm 117 is raised, lever part 177 is raised when collar 144 engages it. Lever part 177 is riveted to lever part 178. Lever part 177 is thus hinged so it can be swung aside as indicated by dot-dash line 177a when it is desirable to disengage it. Part 178 is pin connected to two raised lugs 115a on frame part 115. Jaws on lever part 178 engage the end of rocker 179 which is pin connected to piece 167. Spring 180 keeps rocker 179 clear of cam 172 when pivot arm 117 is not lowered fully or when lever part 177 is disengaged and rocker 179 is not operating. The conical point on rocker 179 engages one of the slots 172a—b—c or d when pivot arm 117 is forced down so that stylus 14c touches the paper or working surface. When stylus 14c is forced down onto the paper or working surface, pivot arm 117 which holds stylus 14c as well as screw 142 which is threaded to 117 come down, and after closing the gap between screw 142 and lever part 177, it forces the latter down. Lever part 117 is riveted to one end of lever part 178, the other end of which raises when lever part 177 is forced down. The jaws on lever part 178 engage the flat end of rocker 179, thus raising such flat end. Since element 179 is a rocker, when the flat end is raised by lever part 178, the conical pointed other end is forced down. The gap between screw 142 and lever part 177 allows pivot arm 117 to lower or raise slightly after rocker 179 engages cam 172, thus pivot arm 117 may be raised and lowered slightly when making intermittent lines (such as dotted lines) without unlocking the position. The conical end of rocker 179 is split and widened (see Fig. 26) so that it fits slots tightly (see Fig. 27). Rocker 179 is forced into a slot, such as 172b. Friction holds it in until pivot arm 117 is lifted high and lever parts 177—178 lift rocker 179 out of the slot. Spring 180 is not strong enough to overcome the friction of rocker 179 in the slot. The centerlines of the slots in cam 172 are off center of the neutral circle diameter 181 (see Fig. 26 and Fig. 27).

The radius to centerline distance of slots 172a and 172d is greater than the radius of circle 181. The radius to centerline distance of slots 172b and 172c is less than the radius of circle 181. The conical point of rocker 179 has a tendency to stay on the neutral circle diameter when in neutral, since part 164 has a tendency to stay in neutral and it is connected to shaft 166 which has piece 167 fastened to it and rocker 179 rocks snugly in piece 167. So when rocker 179 is forced into the slot in cam 172, it moves laterally when it engages the slot since the slot is off center. This lateral movement through space 182 (see Fig. 27) turns piece 167 slightly which turns shaft 166, which turns or rocks arms 164, 164a, 164b and clutch gear parts 161 and 165, thus locking or shifting gears for the required operation. Electrical mechanism for operating and locking will be explained hereinafter in connection with Fig. 57.

Hand rest 183 (Fig. 24) fastened by a set screw on shaft 173 above sprocket 174 is circular. Hand rest 183 allows the hand to rest on carriage M when operating with control Ya, etc. On a large graphic machine, such as would be practical for a shipbuilding mold loft, it may be desirable to have the operator ride on the machine, seated on hand rest 183.

*Line measuring scale*

The automatic built-in scale or measuring mechanism for measuring lengths of lines drawn with different scales is shown mainly in Figs. 28, 33, 37 and 41.

Figure 56:
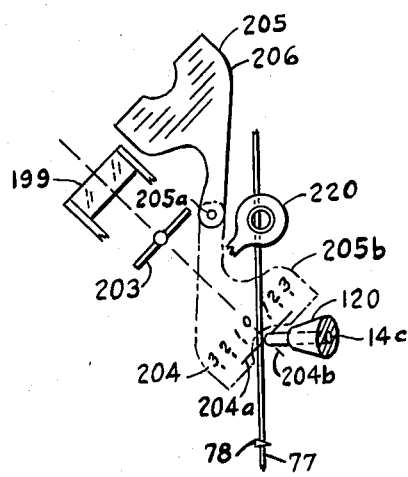
Fig. 56 is a sectional view taken along line 56—56 of Fig. 37.
Figure 53:
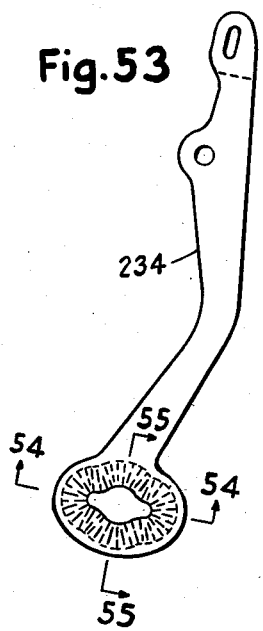
Fig. 53 is a plan view of the arm included in Fig. 52.

The image of the selected scale is projected onto the drawing or working surface at the stylus (see Fig. 56). The scale is synchronized with the movement of carriage M so that any movement is automatically shown in the projected image.

A train of gears (see Figs. 33 and 37) starting at the drive shaft 149 includes gear 184 which is fastened to shaft 149 with a set screw, gear 185a which engages gear 184, gear 185b which is part of the same piece as gear 185a and gear 186 which meshes with gear 185b. Composite gear 185a—185b revolves on shaft 173. It is held in place by a tight fitting collar 187. Gear 186 revolves on shaft 166. The end of gear 186 and the face of scale wheel 88 act as clutch surfaces when in contact. Spring 189 tends to force gear 186 against scale wheel 188 so as to form a clutch, thus scale wheel 188 may be turned by gear 186. A transparent or translucent scale band 190 (see Fig. 45) is fastened around scale wheel 188. Perforations in scale band 190 similar to those in motion picture film engage the teeth on scale wheel 188 as shown in Figs. 43 and 44. The ends of scale band 190 are fastened together with splice plates 191 and 192 (see Figs. 42, 43 and 44). Plate 191 is made of steel so that it can be attracted by permanent magnet 193 which is located to frame post 116. Magnet 193 could be a powerful aluminum-nickel-cobalt alloy ("Alnico") metal. Plate 191 has four holes which line up with perforations in the ends of scale band 190 and the teeth in scale wheel 188 and plate 192. Plate 192 has two teeth which engage perforations in band 190 and plate 191. Plate 192 has a hole for a machine screw. The screw passes through plate 192, the gap in band 190 and enters tapped hole in plate 191. This completes the splice. Band 190 is perforated along both edges so that it can be mounted on scale wheel 188 in any direction such as reversing sides and edges in relation to wheel 188 so as to obtain the proper setup when the position of the machine, view of projected scale by the operator and type of lens or optical system require it. Band 190 may be made with various scales printed on its surface the same as motion picture film is made and printed. It is inexpensive and many different scales can be printed on its periphery with photographic solutions. It can be made in color or black and white, positive or negative. Scales on band 190 are proportional to the distance carriage M moves. For example, if gears that drive gear 186—188 are designed so that when carriage M moves one inch, wheel 188 revolves only one-eighth inch, then the so-called full size scale on band 190 is only one-eighth full size, and the so-called half size scale is only one-sixteenth, etc. When the scales on band 190 are projected, the projected image is enlarged to nominal size. In projecting for very small scaled work, it may be enlarged more than nominal size. Scale mechanism is designed to use this scale ratio so that the time lag in return of the scale to zero is done at almost split second speed. Also, it keeps the size of band 190 small, light in weight and inexpensive to manufacture.

The optical system used to project the scale image is shown in Fig. 28 and Fig. 37. A projection bulb 194 has a mask 195 in front of it. Mask 195 has a slot to allow light to pass through. This light area is only wide enough to cover one of the plurality of scales on band 190. The light now passes through band 190 picking up the image, then through lens 196, prism 197 where it is bent 90 degrees, then through prism 198 where it is again bent 90 degrees, and then through prism 199 where it is bent slightly so as to project it onto the paper or working surface as shown in Fig. 56. Mirrors may be used instead of prisms for bending the light. A support 200 which supports bulb 194, mask 195, lens 196 and prism 197 is supported by framework 113. Support 200 has two pins fastened to it, which pins slide in holes in framework 113. They tend to hold support 200 in its true position. A spring 201 tends to keep support 200 away from framework 113. To adjust the optical system so as to bring the proper scale on band 190 in play, the operator turns adjusting screw 202 which is threaded into shaft 173. Adjusting screw 202 has a knurled knob 202a which is gripped for turning. The end of screw 202 bears against the holder for lens 196 which is fastened to support 200, thus by turning screw 202, support 200 is forced down to compress spring 201, or, screw 202 may be turned to allow support 200 to rise due to the action of spring 201. When support 200 is raised or lowered, the slotted hole in mask 195 and other optical parts are adjusted to the selected scale on band 190. By a twist of knob 202a, a different scale may be brought into play.

Projection bulb 194 has a shield around it which prevents light from straying. It could also absorb heat from the bulb and act as a reflector. Bulb 194 may be a clear bulb with a concentrated filament which may project the scale image without lens 196. Scale wheel 188 may be perforated to allow the heat from bulb 194 to escape. Mask 195 may be made so as to have an adjustable slot so as to allow two adjoining scales to be projected simultaneously. This would allow a metric scale to be projected alongside of an English system scale when a drawing is being made either in both scales or redrawn from one scale system to another. In drawing stress diagrams for solutions of engineering problems, adjoining scales of length and weight could be projected simultaneously for comparison, thus answers may be read instantly.

Interchangeable lenses or various lenses mounted in a turret (not shown) may be selectively used as lens 196 so that the image can be enlarged to a greater size as when a very small scale is being used.

Prism 199 has supports secured to frame post 116, which supports are hinged thereto so that prism 199 is angularly adjustable. In order to orient carriage M so that when pivot arm 117 is lowered, stile 14c hits the spot desired for starting a line, a crossed hair unit 203 is placed in the projected light beam so as to cast a crossed hair shadow on the projected scale on paper or working surface (see Figs. 24, 37, 50 and 56). Unit 203 may include a light polarizing sheet ("Polaroid") with cement. Shank 203c fits a hole in frame post 116 and is held thereby a set screw so that it can be adjusted. In Fig. 56 the projected scale is denoted by numeral 204 and the crossed hair projected image is denoted by numerals 204a and 204b.

Scale image 204 will not show or reflect on a dark or clear surface, such as dark template paper, metal, etc., therefore, a screen 205 which will reflect projected scale 204 may be swung into position to receive it (see Figs. 24, 37 and 56). Screen 205 is shown by full lines in the position taken when it is not being used and is swung aside. In Fig. 56 dot-dash outline 205b is the position screen 205 is swung into when it is being used. Screen 205 is pivotally supported by a pin 205a which is threaded into frame post 116 (see Fig. 51). A light polarizing screen 206 which is slightly above screen 205 and is the same shape as screen 205 is swung into place when it is required to screen out unwanted polarized light. The grains in unit 203 and screen 205 are parallel so as to allow the projected image 204 to pass therethrough. When illuminating light is polarized, parts 203 and 205 screen it out.

Scale band 190 is made so that zero on all scales line up before carriage M moves. Scale band 190 is in the neutral or zero position so that zero marking is projected on image 204. After carriage M moves the scale band 190 revolves projecting the scale image. The scale band must return to zero position again before being projected to measure another line. Gear 186 is raised above scale wheel 188, thereby disengaging the clutching surfaces. A resilient band 207 which may be a tension spring or rubber band, is banded partly around a groove in scale wheel 188. It is fastened to frame post 116 and to scale wheel 188 (at the zero point). Band 207 returns scale wheel and band 188—190 to zero after scale wheel 188 is disengaged from gear 186 thereby acting as a zero reset. Magnet 193 has splice plate 191 attracted to it, thus forcing scale band 190 into exact zero position. This magnetic force quickly overcomes the tendency of scale band 190 to swing back and forth when returned to zero, having a damping effect, and it overcomes any slight change in the tension of band 207 on either side of frame post 116 which would prevent scale band 190 from returning to the exact zero point.

The scale recording is automatic for most types of work (see Figs. 33 and 37). When pivot arm 117 is raised fully, scale lever part 208 comes in contact with the top of cam J and is raised thereby (see detail of part 208, Fig. 35). Lever part 208 is riveted or pin connected to scale lever parts 209 and 210 so that parts 208 and 210 are hinged to part 209 and are free to swing aside. When automatic scale recording is not wanted, lever part 208 is swung aside to position 208a. Lever part 208 may be operated manually when in this position when it is desirable. Lever part 210 is used to keep parts 208 and 209 raised when no recording is required, thus reducing the drag on the power source. Lever part 210 is shown hinged to engage the end of set screw 211 in frame post 116, thus preventing the scale from operating (see detail of part 210 in Fig. 36). Lever part 209 is hinged to frame 115 with pin 212 (see Fig. 33). Pins 209a and 209b on part 209 engage the recessed hub of gear 186, thus when part 209 is raised, gear 186 is raised allowing wheel and band 188 and 190, respectively, to return to the zero position. Since spring 189 tends to push gear 186 in contact with heel 188, the former pulls lever part 209 down, when pivot arm 117 is down. The gap above part 208, when it is in position above cam J, allows pivot arm 117 to be raised and lowered slightly while intermittent or dotted lines are being drawn without causing cam J to bear against part 208 and thus preventing tripping the scale back to zero.

When the machine is to be used only for full sized work or when only one scale is to be used for a long period, a different scale arrangement may be used to advantage. It would operate similar to an automobile speedometer (not shown). The figures may be reflected or projected onto the vicinity of the stile or stylus and the controls on the pivot arm may be the same. The measuring figures may be geared so as to register the distance moved on a series of drums or discs so that one revolution of the right-hand drum would measure one inch, the drum to the left of it, one foot for one revolution, the next drum to the left, ten feet for one revolution, and the next drum on the left, one hundred feet for one revolution.

Thus, only the right-hand figure would be revolving fast, and the others may be read easily without slowing down the movement of the machine.

This arrangement would be ideal for template work and for laying out working surfaces of materials that are to be fabricated.

*Dotting cam assembly*

A cam assembly J on shaft 118 is used for making intermittent lines which include short dash lines (commonly called dotted lines), dot-dash-dot lines, such as centerlines, and long dash lines that are often used as extension lines (see Fig. 24, 37, 46, 47, 48 and 49). Assembly J is made up of cam 213, cam 214 and cam 215. Cam 213 is press fitted to the outside of cam 214 and the latter is press fitted to outside of cam 215. A set screw 216 fastens the cam assembly J to shaft 118. Fig. 47 is a fragmentary view of the outside of cam 213. Fig. 48 is a fragmentary view of the outside of cam 214. Fig. 49 is a fragmentary view of the outside of cam 215. An adjustable cam follower 217 is fastened to frame post 116 with a machine screw. As shown in Fig. 37, cam follower 217 has a slotted hole (for adjustment) through which a machine screw is inserted fastening it to post 116. By loosening the machine screw, cam follower 217 can be adjusted up, down, in and out to engage the cam desired and the machine screw is tightened. Cam follower 217 is adjusted to bring it into play with the cam that is to be used. Since shaft 118 revolves when carriage M is in motion, assembly J revolves with it, and when cam follower 217 is adjusted to engage assembly J, a reciprocating motion is made when pivot arm 117 is held lightly down, thus causing stylus 14c to make intermittent markings. When pivot control Y is held instead of pivot arm 117, the resiliency of handle 135 allows easier control when held downward slightly.

An illuminating light 218 is supported from frame 113 (see Figs. 24 and 39). A piece of light polarizing material 219 is fastened to light 218 with the grain of the polarizing sheet vertical. Screen 219 allows light through, but polarizes it so that it cannot reflect back from the projected scale to the operator when the scale 204 is covered by the polarizing screen 206. Other illuminating lights, including windows, may have light polarizing screens to control the light in the same manner, also, to cut down unwanted reflections.

*Drawing of curved lines*

When irregular or regular curved lines are to be drawn with carriage M, curve guide 221 having such contour, a French curve, or a ship curve is followed with contour follower 220 which is supported by frame post 116 (see Figs. 24, 37 and 51). Contour follower 220 is fastened to frame post 116 with a threaded stud and knurled threaded nut which may be loosened so that follower 220 can be swung aside to position 220a in Fig. 51 when it is not being used and would obscure other operations. The circular edge of contour follower 220 bears against curve guide 221. Two small lugs on follower 220 prevent it from turning when it is fastened securely to frame post 116 and is being used. Follower 220 prevents curve guide 221 from cutting into stylus 14c. It maintains a constant distance from the center of stylus 14c to the edge of curve guide 221. It allows the operator to easily make dotted or intermittent curved lines. In making dotted or intermittent lines while following a curved guide 221, it is necessary to have the follower 220 continuously maintain contact with guide 221 while stylus 14c is raised to allow for gaps in the intermittent lines (since the sloping surfaces of stylus 14c and follower 120 would offer insecure contact with guide 221, at various pivot angles, and stylus holder 120 because stylus 14c would revolve against guide 221, thus grinding the stylus or guide). One fault of using fine mechanical pencils in drafting work is the undercutting by contact with guides such as thin plastic triangles or curved guides. Follower 220 allows free unhampered accurate movement in the following a guide. It is necessary for accurate work since curves are drawn from predetermined points and a curve guide 221 is necessary to visibly tie up these points. Follower 220 maintains an exact distance from the points to the edge of curve guide 221.

When carriage M is used to draw lettering, very small circles, ellipses, standard symbols, etc. with standard guides, it would be impossible to follow these guides with contour follower 220, and it would be too costly to make special guides to fit follower 220, so contour follower 222 is used with these small standard guides 223 (see Figs. 24, 28 and 39). Follower 222 has a ball point at the bottom which bears against guide 223. Follower 222 is fastened to sliding shaft 224 with a machine screw. Shaft 224 is tapped. Contour follower 222 has a slotted hole for adjustment and is usually set in a vertical position, but it may be swung aside and tightened so as to help draw a larger circle, etc. than that to be made with follower 222 in vertical position. Contour follower 222 moves to position 222a when swung aside (see Fig. 24). Shaft 224 slides in and is supported by framework 113. A flange 224a on shaft 224 has a helical spring 225 bearing against it, tending to raise it. A lever yoke 226 which has one end hinged to frame 113, bears against flanged top 224a and governs the sliding movement of shaft 224 and follower 222. Yoke 226 has a wire 227 fastened to it which extends to lever 228 on frame post 116. Lever 228 has a jaw at the other end which engages an offset 117a on pivot arm 117. When arm 117 is lowered, follower 222 is lowered also through the action of connecting mechanisms. Thus, follower 222 is lowered to recess in guide 223 when required, and it rises automatically when arm 117 is raised. This allows the operator to hold pivot control Y with one hand and guide 223 with the other hand. A pin 229 holds wire 227 in proper position.

Many small auxiliary circles are made on engineering drawings. These circles encircle item numbers, section marks, weld sequence notations, building column line numbers, revision numbers, etc. These circles are of secondary importance and are often drawn with plastic guides. The width of the lines describing these circles is of little importance so long as the lines are dense and thus legible after reproducing. Other standard markings which are often made with plastic guides are in the same category.

When plastic guides for circles, ellipses, etc., especially in the larger sizes, are used to draw part of a structure, and the thickness of the lines is to be kept constant, pivot control Y is revolved as the guide is followed around half the ellipse, etc., and the stylus is then lifted and arm 117 is pivoted in a reverse direction 180 degrees. Stylus 14c is lowered where the half ellipse line was stopped, and the other half of the ellipse is drawn. This drawing half an ellipse at a time is done by some draftsmen with ordinary pencil to avoid unnatural hand positions while drawing.

When carriage M is used with beam G as a beam compass as described earlier, it would be to advantage to be able to hold arm 117 down with a constant pressure and have the correct pivot angle held by locking it into place so the adjustable resilient holddown 230 can be set so that when arm 117 is lowered, hold-down 230 bears against the top of offset 117a, holding arm 117 down, and the small end of hold-down 230 engages teeth-like indentations 117b in arm 117, thus holding the arm at the set pivot angle. The long thin end of hold-down 230 is resilient and it can be set to hold arm 117 down with a constant pressure. By using hold-down 230, the operator's hands are free to control other parts of the machine. This hold-down 230 may be used when drawing long lines, especially in a template or fabricating shop.

Chain switching mechanism

Engaging and disengaging chain 57 and 58 from operating with carriage M can be quickly handled by turning knurled wheel 231 (see Figs. 28, 30 and 34).

Catch 232 (see Fig. 34) slides in a slot in framework 113 (see Fig. 30). Catch 232 has a rounded threaded end 232a which passes through plain holes in framework 113. The other end of catch 232 is square. It slides in the square hole in framework 113. Knurled wheel 231 is threaded to fit shaft 232a of catch 232. Wheel 231 is held in position by a yoke formed by framework 113 (see Fig. 33). When wheel 231 is turned, it causes catch 232 to move. When it moves in one direction, it forces chain 57 against brake block 233a which is fastened to framework 113, thus chain 57 is locked to carriage M and any movement of the carriage along body 53 moves chain 57. When the wheel is turned in the opposite direction, it moves catch 232 to force the left-hand chain 57 against brake block 233b, locking it. In Fig. 34 catch 232 is shown in the neutral position neither right or left part of chain 57 being locked to carriage M.

Pivot chain 58 is engaged or disengaged from operating with carriage M simultaneously with chain 57. Lever 234 is connected to framework 113 with pin 235 and to catch 232—232a with pin 236 (see Figs. 25, 28, 33, 34 and 29, also see Figs. 53, 54, and 55 for retail of lever 234). When catch 232 is moved by turning wheel 231, lever 234 is moved or pivoted by its connection with catch 232. The other end of lever 234 controls the clutch for engaging or disengaging chain 58.

A sprocket 237 is welded to arm 117. It is centered about shaft 118, but it does not touch shaft 118 (see Figs. 37 and 28). A chain 238 connects sprocket 237 with a sprocket 239 which is supported on framework 113 and revolves on shaft 240 (see Figs. 28 and 52). Sprocket 239 is fastened to shaft 240 with a pin.

Chain 58 is looped around sprocket 241 and it is held in position by idler sprockets 242a and 242b (see Figs. 28, 31, 24, 37 and 52). The upper part of sprocket 241 has a tapered or conical shape (see Fig. 52). The other side of sprocket 241 has a counterbored hole to form at cavity for a helical spring 243. Shaft 240 has a wide thin flange or head on the bottom. The upper surface of the flange on shaft 240 has a resilient pad, such as rubber, cemented to it. Sprocket 241 tends to rise slightly above the flange on shaft 240. When lever 234 is in the neutral position, as shown (see Fig. 31), chains 57 and 58 are disengaged from acting with carriage M. When the hole in lever 234 is centered with shaft 240 and sprocket 241, lever 234 is in the neutral position. When wheel 231 is turned to engage either the left or right part of chain 57, lever 234 is pivoted about pin 235 and the end of lever 234 moves so that a narrow end of the tapered hole in lever 234 moves into a position above sprocket 241, the tapered depth of the hole has the same slope as the upper part of sprocket 241 as lever 234 moves into position, sprocket 241 is forced down so that the bottom thereof bears against the resilient surface of the flange on shaft 240, thus clutching or engaging these surfaces. So when arm 117 turns, sprocket 237 turns and chain 238 turns sprocket 239, the latter turning shaft 240 which turns sprocket 241. So chains 57 and 58 are always either in neutral or engaged at the same time.

Secondary carriage "C"

The secondary carriage C is shown by Figs. 65 to 81. Fig. 65 shows an elevation of carriage C. Fig. 69 is a section through the lower part of carriage C.

The main framework part 244 is supported by three flanged wheels 245a, 245b and 245c which ride on the edges of beam 59. Pivot arm 246 is fastened to part 244 and is supported thereby through pins 247 and 248. Arm 246 may be pivoted 270 degrees, as is carriage M. Thus, carriage C may be worked in conjunction with carriage M to utilize to the fullest extent their possibilities as versatile components of the machine.

Stylus or stile 14d is identical to styli 14c and 14, insofar as the principles of operation of a rotary stylus or stile is concerned.

Stile or stylus holder group Ea consists of part 249 which is similar to stylus holder 120. Parts noted with "p" in Fig. 74 are identical to those on carriage M shown in Figs. 37 and 59.

Shaft 250 is fitted to shaft 254. A bevel gear 251 is fastened to shaft 250 with a set screw. A reversible motor 252 has a bevel gear 253 fastened to it which meshes with gear 251. Thus, motor 252 drives or rotates shaft 254, etc., and stylus 14d rotates. Figs. 76 to 80 show the operation of the automatic feeding arrangement for stile or stylus 14d (and 25gp).

This feeding mechanism is similar to that on carriage M since the drive for carriage C (Ea) is from the top. Stylus holder shaft 254 is similar to shaft 124, except that it has gear teeth cut on the outside at the bottom (see Fig. 78a). Fig. 75 shows liquid stylus 25gp.

Elements 429 to 434 in Fig. 78a to Fig. 80b, inclusive, are the equivalents of and operate similar to elements 129 to 134, respectively, in Fig. 63a and Fig. 63b. That is, for example, element 430 of Fig. 80a corresponds to element 130 in Fig. 63a.

A spring 255 keeps arm 246 in raised position, except when force is applied. A pair of electromagnets 256 are fastened to framework 244. They are controlled from carriage M. When activated, they pull down arm 246 which has an iron plate 257 fastened to it. A spring 257a maintains tension to hold arm 246 down so 14d maintains contact with the paper.

The chain switching mechanism is similar to that on carriage M, except for the fact that the pivoting is controlled from carriage M. The operator moves carriage C from carriage M.

Secondary carriage "BR"

The secondary carriage BR is shown in Figs. 82 to 99. Figs. 82 shows an elevation of carriage BR. Carriage BR is a right-handed carriage. Carriage BL, which is not shown in detail, is reverse, or left-handed, as compared to carriage BR. Carriages BR and BL are necessary in drawing at close quarters, such as in structural drafting, that is, when lines drawn with M and BR or C and BL are as little as 1/16 inch apart. Although carriage BR can be pivoted only 90 degrees, and when it is operating carriages M and C can be pivoted only 90 degrees, it is indispensible for close work with carriages M and C since the stile on carriage BR can be used when it is touching or almost touching the stile on carriage M. The stile on carriage BL can be touching or almost touching the stile on carriage C. The design of carriage BR eliminates the superstructure above the stile so that it can be brought close to carriage M without interference. Carriage BR pivots 90 degrees, but the support for the pivot arm, etc. is not at the radial point.

Framework 259 is supported by three flanged wheels 260a, 260b and 260c which ride on the edges of beam 53. Pivot arm 261 is held at the bottom by pin 262 (see Fig. 83). Pin 262 slides in slot 259a (Fig. 86) vertically and radially. Shaft 263 supports and keeps arm 261 in its true position. Spur gears 264a and 264b engage gear teeth 259b and 259c on framework 259, thus shaft 263 keeps arm 261 in a true vertical position at all times as it is pivoted. Wheels 265, 266 and 267 keep shaft 263 and arm 261 in place. Wheel 267 slides on shaft 268 or back of frame 259 when the arm is raised and lowered. Frame 259 is offset above wheel 267 so that the wheel is held, thus preventing the arm 261 from raising too much. A pair of electromagnets 269 are fastened to arm 261 with spring 269a. They are controlled from carriage M. A curved iron plate 270 is fastened to framework 259. Electromagnet 269 is attracted to plate 270. A spring 277 tends to lift arm 261, except electromagnet 269 forces arm 261 down. Spring 259a maintains tension on arm 261 and stylus. The chain switching arrangement is similar to that of carriage C.

Part gear 271 is welded to arm 261. Its teeth are centered about the pivot point of stile, etc. Gear 271 meshes and slides vertically against part gear 272, which gear is supported by shaft 273 (see Figs. 93a and 93b). Shaft 273 is threaded to framework 259. Lever 274

Fig. 90) is controlled the same as lever 234 on carriage M. Sprocket 275 has a conical bottom and a resilient surface on the top. Spring 276 keeps part gear 272 and sprocket 275 separated, except when lever 274 is moved, which forces sprocket 275 against part gear 272 to effect engagement thereof. Therefore, when chain 58 is moved by the action of carriage M, chain 58 turns sprocket 275 which turns part gear 272 and the latter turns gear 271, thus pivoting arm 261.

The stylus or stile feeder on carriage BR is similar to that on carriage C. Lever 278 of the stylus feeder tilts when it touches surface 259d of framework 259, thus starting the feeding mechanism (see Figs. 89, 94, 97a, 97b, 98a, 98b, 99a and 99b).

Motor 285 is a reversible motor on carriage BR.

*Electrical control system*

Fig. 100 shows a wiring diagram for the complete graphic machine.

Power source 279 into which may be plugged a plug 280a, may be an ordinary household 110 volt, 60 cycle A. C. source which furnishes energizing current controlled by switches 281a and 281b. Rheostat 282 controls the current and speed of the motors. Commutator 296 and reversing switch 284 control all the motors.

Manually operated reversible motor switch 284 is used when operating carriages BR and BL with carriage M. When only carriages M and C are being used, with controls to carriages BR and BL switched off, the commutator or switch 296, which is keyed to cam 172, is used to automatically reverse the motors as the result of pivoting of pivot arm 117 to predetermined zones. Contact brush set 297 is fastened to hand rest 183 (see Fig. 24). Zones on commutator 296 and cam 172 are marked 298a, b and c which correspond to pivot angle zones 168a, b and c (see Fig. 25), and 299a, b and c which correspond to pivot angles 169a, b and c (see Fig. 25).

Manually operated switch 300 connects the power lines and the lines to the motor to either manual reversing switch 284 or to commutator 296.

Commutator 296 controls the motors by pivoting the pivot arm 117 to a selected zone 168a, b, c or 169a, b or c. The arrow shown in the segment of each zone (see Fig. 100) indicates the direction of travel of the carriage when pivot arm 117 is lowered within that segmental zone.

Figure 57:
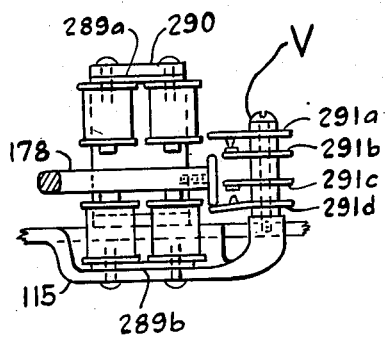
Fig. 57 is a fragmentary elevational view showing the electromagnets and taken along line 57—57 of Fig. 25.
Figure 54:
Fig. 54 is a cross-sectional view taken along line 54—54 of Fig. 53.
Figure 55:
Fig. 55 is a cross-sectional view taken along line 55—55 of Fig. 53.

Numerals 286a, 286b, 286c, 280b, 280c and 280d denote plugs. Numerals 287a, 287b, 283b and 287c denote switches. Jack R (see Figs. 24 and 37) has four contact fingers or prongs 288a, b. c, and d. Jack R is shown as it would be when pivot arm 117 is in the raised position. Collar 144 on arm 118 bears slightly or not at all against energizing prong 288b. Prong 288b bears against prong 288a which carries current to contact prong 291c on lock V (291a, b, c and d are prongs on jack of lock V). Fig. 57 shows an electrically powdered lock or plunger V which is electrically controlled by raising and lowering pivot arm 117. This powered lock V rocks lever part 178 and this action rocks rocker 179 which engages cam 172, thus locking and controlling the direction of the travel mechanism. Fig. 100 shows group V in circuit relationship with other elements. Lock V is used only when lever 177 is swung aside from arm 118—144 (lever 177 being for manual operation only). Lever 178a—178 breaks contact between prongs 291c and 291d when magnet 289b pulls lever part 178 down. When arm 117 pulls collar 144 down slightly, it breaks prong 288b with jack prong 288a and contacts prong 288c. Prong 288c completes a circuit through prong 291b, 291a and magnet 289a. Magnet 289a pulls lever part 178 up as an armature and as the latter nears magnet 289a, lever part 178a bends prong 291a, breaking the circuit. When prong 288b contacts prong 288c, a circuit is completed to energize the motors. When collar 144 is pushed down further by arm 117, contact arm prong 288b contacts prong 288d in addition to being in contact with prong 288c. Contact element on prong 288d completes a circuit through magnets 256 and 269 on carriages C, BR and BL. This pulls the pivot arms on carriages C, BR and BL down so that the stile or stylus touches the paper or workable surface. Arm 117 and collar 144 may be raised slightly to break contact with contact 288d, but not far enough to allow contact arm 288b to break with contact arm 288c. Thus, dotted or intermittent lines can be made without breaking the locking setup. Thus, the electric controls are synchronized with the mechanisms. All switches, plugs and rheostats can be mounted at K so that the left hand can be used to operate these parts along with L controls, while the right hand is operating carriage M. Rheostat 282 and switch 284 may be operated by foot controlled pedals as L controls could be. This would be especially desirable for a handicapped operator who has the full use of only one hand which would be needed to operate carriage M.

Since rheostat 282 would rarely be regulated, the controls, when commutator 296 is operating, would then be handled almost exclusively from carriage M, and they would be more automatic.

*Drafting machine assemblies*

Figure 101:
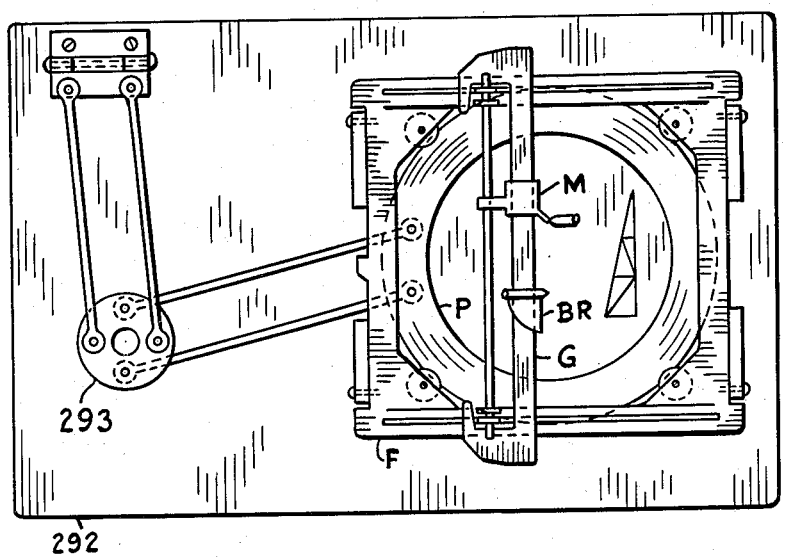
Fig. 101 is a plan view showing the graphic machine of the present invention as a component part of the well-known type of drafting machine.

A subcombination is shown in Fig. 101. Drawing board or workable surface 292 has part of a typical drafting machine fastened to it. The graphic machine has part 293 fastened to it with two pins so that arms can rotate on pins freely. Lower beams H, D, C and BL are omitted. The legs are folded up from the frame. The drawing is fastened to workable surface 292 or the latter is drawn on. Graphic machine may be slid or raised slightly and moved over the surface 292 when so desired. Thus the machine may be used locally on a large drawing.

Figure 102:
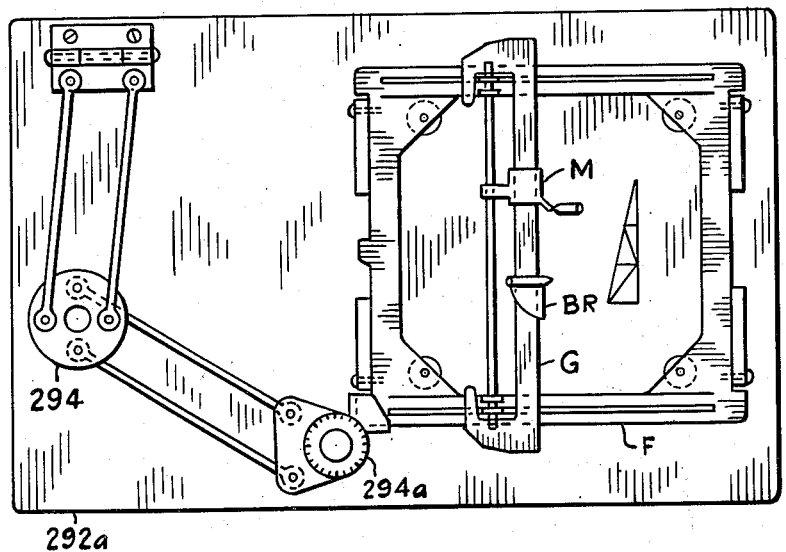
Fig. 102 is a plan view of the graphic machine of the present invention used and associated with a well-known type of drafting apparatus.

A subcombination is shown in Fig. 102. Workable surface 292a is similar to surface 292. Part 294 is similar to part 293. It has the protractor part of a drafting machine on it. 294a graphic machine has parts F, G, M, T and BR. Protractor P is omitted. The arrangement shown in Fig. 102 works similar to that in Fig. 101, but for drawing diagonal lines, in Fig. 102, the protractor 294a on part 294 is used, instead of protractor P on Fig. 101. The arrangement shown in Fig. 101 would be of use in a very wide field of drafting.

The arrangement shown in Fig. 102 is not as accurate for drawing diagonal lines, but when the work being done has few diagonal lines, it would be highly practical, especially if the operator already has a standard drafting machine setup.

The graphic machine, such as that shown in Fig. 10, may have marking devices and tools other than conical rotating styli attached to the pivot arms.

Figs. 103 to 109, inclusive, show such marking devices and tools that are graphically guided by the machine and carriage M. They may be similarly used with secondary carriages BR, BL and C.

In the fabrication of structural steel, etc., the centers of holes to be punched or drilled and the outline of cuts to be made are often center-punch marked. That is, a pointed steel tool is driven with a hand hammer to make a small conically-shaped dent or hole in the surface of the piece to be laid out. The dent or hole, which is sometimes 1/16" to 1/8" deep, is called a center-punch mark. It centers the tip of the drill or punch which is used to make the complete hole through the piece. Center-punch marks for indicating cuts are advantageous because they do not rub or wear off.

Fig. 103 shows a rotating marking device embodying a drill for making marks similar to that made by a center-punch, or for making the finished hole, thus eliminating the actual marking operation on the piece. This arrangement is practical for the secondary carriages BR, BL and C. To use it with the master M would require locating the desired center for a hole, locking carriage M to beam G with screw 80 and beam G to frame F with pin 79 bearing tightly against framework 36, and then unlocking the automatic locking mechanism on carriage M, otherwise the stylus on carriage M would not revolve when carriage M is standing still, except when holes are being drilled on a circular line. Carriage M could be operated more efficiently if, as in Fig. 104, it had independently operated motor for rotating the drill.

In Fig. 103 a shaft replaces the stylus and it is fastened with the set screw in holder 120 to prevent slipping. A beveled gear 301 is keyed to the shaft. Beveled gear 302 is keyed to chuck 303, and meshes with beveled gear 301.

Drill or tool 304 is rigidly held by chuck 303. Support 305 which holds these parts is fastened to pivot arm 117.

Fig. 104 shows a further modification including a motor chuck unit 306 for holding the drill and including a driving motor similar to a common portable drill. Unit 306 is supported from pivot arm 117 by support 307 attached to the unit and arm.

Fig. 105 shows a further modification similar to that shown in Fig. 103, except that the driven part is turned 90 degrees. In Fig. 105 the chuck holds a round marking device, such as a grinding wheel 308, whose cylindrical surface can mark various width lines on glass, metal, plastics, etc., when pivoted, as the conical rotating stylus is pivoted.

Chucks shown in Figs. 103, 104, and 105 are adapted to hold other marking devices and tools, such as drills, reamers, routers, milling cutters, rotary saws, grinders, polishers and cutting stones.

Fig. 106 shows a further modification including a nozzle 309 whose support 310 is fastened to pivot arm 117. Nozzle 309 has a rectangular opening whose long side is parallel to support 310. Nozzle 309 is in communication with reservoir 311 by means of a tube. Reservoir 311 has valves to regulate or stop the flow of its contents. This arrangement allows the nozzle 309, with reservoir 311 filled with ink, paint or other liquid solutions, to act as an air brush to spray a variable width line on the workable surface W, pivot arm 117 being pivotable the same as it would be for making variable width lines with the rotating conical stylus as described hereinbefore. Air brushes are used in commercial art work. With a rectangular opening in the nozzle, they can make as thin or broad a line as would be required on all engineering drawings. They are also valuable in marking material to be fabricated, such as structural steel.

Fig. 110 shows a modification for acetylene-oxygen gas burning or cutting of metals, wherein the reservoirs hold gas. The rectangular hole in nozzle 409 controls the width of the burn or cut when pivot arm 117 is pivoted to the proper zone. Nozzle 409 can be tilted and adjusted by means of the slot in support 410 for beveled cuts, etc. Much structural steel work is now cut by torches which are guided with graphic machines, such as a pantograph. With different nozzle openings, burning or flame gouging of edges can be effected—also gas welding, brazing and soldering.

Electric arc cutting and welding may be accomplished semi-automatically with an electrode holder in place of nozzle 409 and reservoir 411 including an automatic feeder for the electrode. The plug for feeding in the current from the welding generator or transformer could be attached to nozzle 410.

Fig. 107 shows an arrangement for using a vibrating or reciprocating mechanism 313 which is fastened to support 314 which, in turn, is supported by pivot arm 117. Reciprocating mechanism 313 may be electrically or air operated so as to be moved or vibrated rapidly such as in conventional electric vibrating marking devices. Tool 312 may be a pencil point, a pen, a hard needle for indenting a surface, a file, a straight saw, or a chisel-shaped end for making variable width lines when pivoted.

Fig. 108 shows an arrangement for a follower which may be used on master carriage M or on a secondary carriage to follow the contour of a template or master piece 315, or a sketch on a drawing. The follower 316 has a round shaft which revolves freely in a hole in support 317. A small pin prevents follower 316 from falling out of the hole in support 317. Support 317 is fastened to pivot arm 117. A knife edge 316a on follower 316 follows the contour of the work to be matched.

Fig. 109 shows an arrangement of a grinder, cutter or other tool 318 which may be used with the machine. Tools with beveled or rounded marking or cutting surfaces other than shown may be used.

The above described graphic machine embodying my invention is useful for making engineering drawings, stress diagrams, templates, commercial art writings, such as show card writing, and lay-outs or markings of fabrication operations on material such as structural steel, sheet metal, including aluminum, or even wood, in shipbuilding, aircraft work, etc. At present, engineering drafting and template making often overlap, especially in aircraft and other sheet metal operations. The graphic machines for doing these various types of work may be of identical design, differing only in the sizes of the machines, for example, drafting requires a small, lightweight machine, while fabricating shop layout work requires a large machine.

While I have illustrated and described certain specific embodiments of my invention, it will be understood that these are by way of illustration only, and that various changes and modifications will be readily suggested to those skilled in the art after having had the benefit of the teachings of the present specification, but which are within the contemplation of the present invention.

For example, instead of using a single stylus and holder, a turret-carrying different styli, wet or dry or having differently shaped styli, or carrying differently colored leads or other types of marking tools or machine tools may be used. Also, while I show magnets for applying motive power for selective locking of the carriage parts, etc., it will be apparent that other power sources may be used instead, such as air or electric motors with limit switches, air or hydraulic power means, etc.

Furthermore, while I have described an automatic graphic machine embodying a revolving stylus, it will be apparent that other types of marking devices may be substituted therefor, still retaining the benefits of the other features of the assembly, such as the automatic features, etc. For example, a fine air brush or air gun of any well-known type, as described, may be used which can spray fine ink lines—or an electric vibrating pencil, as described, may be used, or a non-revolving style for either marking or scratching or pressing into the working surface. Or, instead of using the stylus for marking, it may be used as a guide on a template for guiding tools without marking, as described, such as shop pantographs which guide cutting torches, or small drills for drilling small holes to both mark the center of holes to be punched or drilled and to center tools for starting cutting, welding, brazing and soldering torches. Other tools may likewise be guided, such as electric arc welders, saws, files, grinders, emery cutting wheels, polishers, routers, paint brushes, milling cutters, etc. In structural and sheet metal work, some materials to be fabricated are cut to size, drilled or punched without actually marking them, that is, the tool is guided graphically.

While for purposes of illustration, two beams have been shown, each having two carriages, it will be obvious that other combinations are likewise useful, such as one, three or four beams, each having one or more carriages, depending upon the nature of the work to be performed.

When engineering draftsmen are required to make drawings to a small scale, their production falls off considerably, since the smaller work must be more exacting and must be done more carefully. Also, the finer work requires a closer view by the draftsman and much more eyestrain. For such drawings, a magnifying or reading glass (not shown) may be clamped to the master carriage, near the stylus, thus enabling the draftsman to see an enlarged view of the projected scale along with the drawing in the immediate vicinity of the stylus, thus improving the visibility which enables the draftsman to work much faster.

While I have illustrated and described certain specific embodiments of my invention, it will be understood that these are by way of illustration only, and that various changes and modifications may be made within the contemplation of my invention and within the scope of the following claims.

I claim:

1. An automatic pencil comprising an elongated, substantially cylindrical element of frangible marking material of a color contrasting with that of the drawing surface having a substantially conically shaped point, holder means for rotatably supporting said element, and motor means for rotating said element about its axis so as to deposit colored particles from said conically shaped point onto the drawing surface to make color contrasting lines thereon.

2. An automatic pencil comprising an elongated, substantially cylindrical element of marking material for making color contrasting lines on a drawing surface and having a substantially conically shaped point, holder means for rotatably supporting said element at an acute angle with respect to the surface to be marked thereby so that the slope of said conical point will form a line contact with said surface, and motor means for rotating said element about its axis and for depositing surface particles of said marking material onto the drawing surface at said line of contact to make color contrasting lines thereon.

3. Apparatus as recited in the claim 2 together with means for varying the speed of rotation of said element.

4. An automatic drawing device comprising a substantially cylindrical marking element mounted at an acute angle relative to a drawing surface and having a substantially conical end providing line contact with said surface, a holder rotatably mounting said cylindrical element, means for guiding said holder on said drawing surface, means for rotating said element about its axis in said holder, and means for rotatably mounting said holder about a vertical axis to vary the angularity of said line of contact with respect to the direction of movement of said element and holder for making lines of different widths.

5. A drawing instrument comprising a substantially cylindrical elongated element of marking material having a substantially conical end, a holder for supporting said element at an acute angle with respect to the surface to be marked and so as to provide a line contact therewith along the slope of said conical end, and mechanical coupling means for rotating said cylindrical element about its axis at a speed greater than that derived from frictional rolling contact of said conical end and surface for leaving a film of said material on the surface for marking it, and means for pivotally supporting said holder along a substantially vertical axis so as to change the angularity of said line contact with respect to the direction of movement of said cylindrical element on said surface and thus vary the width of line drawn thereby.

6. Apparatus according to claim 5 together with means for feeding said cylindrical element so as to project it to any desired extent outside of said holder.

7. Apparatus recited in claim 5 together with spring means for normally biasing said holder downwardly to provide contact between said conical surface and the paper or surface to be marked, and means responsive to wear of said conical end for intermittently feeding said element through said holder to compensate for such wear.

8. Apparatus recited in claim 5 together with means responsive to a predetermined lowering of said holder for automatically feeding a portion of said element externally of said holder to compensate for wear of said marking material.

9. The method of drawing lines of variable width comprising rotating a substantially cylindrical element, having a conical end, about its axis while holding the slope of said conical end against the surface to be marked so as to provide a rotary sweeping line contact therewith and pivotally moving said element about a vertical axis to preselect the angle between said line of contact and direction of movement and thereby obtaining a line of predetermined width.

10. Marking apparatus comprising, in combination, an elongated marking element of graphitic material having a conically tapered end portion, holder means for rotatably supporting said element in an inclined position relative to the vertical so that said tapered end portion forms line contact with the surface to be marked, and a power operated means for rotating said element about its axis, said holder means being pivotally supported about a vertical axis so as to adjust the angle between said line of contact and the direction of movement of said element to preselect the width of the lines to be drawn by said element.

11. The method of drawing lines of variable width comprising rotating an elongated, substantially cylindrical marking member, having a conical end, about its axis at relatively high speed while holding the slope of said conical end against the surface to be marked so as to provide line contact therewith, and, by means of a guiding edge, guiding the conical end of said element along a given path at an adjustable angle between said line of contact and the direction of movement of said marking member.

12. A drawing instrument comprising a support, a pair of arms vertically pivoted to each other, one of said arms being vertically pivoted to said support, a holder vertically pivoted to the end of the other arm, a substantially cylindrical element of marking material having a conical end and supported by said holder in an inclined position relative to a working surface so as to provide line contact between a slope of said conical end and said working surface so that lines of variable width may be drawn by selectively pivoting said holder about a vertical axis to vary the angle between said line of contact and the direction of movement of said holder, screw threaded plunger means for selectively feeding said element through said holder to compensate for wear, and an electric motor for rotating said element about its axis at constant speed.

13. Automatic drafting apparatus comprising a marking element, a holder for journaling said marking element, a motor for rotating said marking element about its axis while in said holder, means for automatically feeding said marking element externally of said holder to compensate for wear of said marking element comprising two relatively rotatable elements and means responsive to lowering of said holder in a direction towards the surface to be marked for causing locking of one of said two relatively moving elements and intermittent feeding of said marking element by said motor.

14. Drafting apparatus comprising a substantially cylindrical element having a substantially conically shaped end portion, journal means for rotatably mounting said element, electric motor means for rotating said element about its axis, said journal means being inclined so that the end portion of said element has line contact with the surface of a drawing sheet to be marked by said element, together with a frame and means for resiliently supporting said journal means relative to said frame to permit vertical movement of said holder towards and away from said drawing, a plurality of concentrically disposed cam elements fixed to said journal means, a cam follower mounted on said frame and selectively movable into engagement with any of said cam elements for causing an up and down intermittent movement of said journal means in accordance with the pattern of the selected cam element thereby enabling the drawing of dotted lines, dash lines, and the like.

15. An automatic drawing device comprising a substantially cylindrical coloring element having a substantially conically shaped end portion covered with coloring material, journal means for rotatably mounting said element, and means including a variable speed motor for rotating said element about its axis, said journal means being inclined so that the end portion of said element has line contact with, and deposits coloring material along continuous lines of selective length on, the surface to form lines thereon.

16. A drawing instrument comprising a substantially cylindrical elongated element of marking material having a substantially conical end, a holder for supporting said element at an acute angle with respect to the surface to be marked and so as to provide a line contact therewith along the slope of said conical end, and means for rotating said cylindrical element about its axis to deposit a film of said material on the surface for marking it, and means for pivotally supporting said holder along a substantially vertical axis so as to change the angularity of said line contact with respect to the direction of movement of said cylindrical element on said surface and thus vary the width of line drawn thereby.

17. Apparatus recited in claim 16 together with spring means for normally biasing said holder upwardly out of contact with the surface to be marked, and a plurality of cam surfaces coaxially disposed about said vertical axis for effecting up and down movement of said holder and drawing of discontinuous lines by said cylindrical elongated element.

18. Apparatus recited in claim 5 together with a pivot control element of elongated cylindrical shape geared to said holder and disposed angularly to the surface to be marked so as to be easily grasped to control arcuate movements of said holder about said vertical axis.

19. An automatic drawing device comprising a substantially cylindrical marking element having a substantially conically shaped end portion covered with marking material, journal means for rotatably mounting said element, and means including a variable speed motor for rotating said element about its axis, said journal means being inclined so that the end portion of said element has line contact with, and adheres marking material on, the surface to form lines thereon, together with means for rotatably mounting said journal means about an axis substantially perpendicular to said drawing sheet for angularly varying said line of contact with respect to the direction of movement of said rotatable element on the drawing sheet for varying the thickness of lines drawn thereby.

References Cited in the file of this patent

UNITED STATES PATENTS

| Number | Name | Date |
|---|---|---|
| 467,825 | McCabe | Jan. 26, 1892 |
| 852,430 | Goodman | May 7, 1907 |
| 1,227,862 | Wikberg | May 29, 1917 |
| 1,285,279 | McCabe | Nov. 19, 1918 |
| 1,295,901 | Johnson et al. | Mar. 4, 1919 |
| 1,550,527 | Fischer | Aug. 18, 1925 |
| 1,627,205 | Seaborne | May 3, 1927 |
| 1,638,086 | Carter | Aug. 9, 1927 |
| 1,729,630 | Scott | Oct. 1, 1929 |
| 1,785,883 | Teissere et al. | Dec. 23, 1930 |
| 1,805,740 | Peters | May 19, 1931 |
| 2,017,843 | Cuthbert | Oct. 22, 1935 |
| 2,097,806 | Weidrich | Nov. 2, 1937 |
| 2,143,124 | Hall | Jan. 10, 1939 |
| 2,268,654 | Goddu et al. | Jan. 6, 1942 |
| 2,307,501 | Goddu et al. | Jan. 5, 1943 |
| 2,347,558 | Hedin | Apr. 25, 1944 |
| 2,403,633 | Browning | July 9, 1946 |